US008599442B2

(12) United States Patent
Yukumoto et al.

(10) Patent No.: US 8,599,442 B2
(45) Date of Patent: Dec. 3, 2013

(54) IMAGE PROCESSING APPARATUS UTILIZATION SYSTEM AND IMAGE PROCESSING APPARATUS UTILIZATION METHOD FOR AN IMAGE PROCESSING APPARATUS UTILIZATION SYSTEM INCLUDING IMAGE PROCESSING APPARATUSES, A SCENARIO GENERATION UNIT, A SCENARIO STORING UNIT, AND AN IMAGE DELIVERY UNIT THAT ARE CONNECTED VIA A NETWORK

(75) Inventors: Reiji Yukumoto, Saltama (JP); Osamu Torii, Chiba (JP); Hiroki Hiraguchi, Tokyo (JP); Yasukiyo Nakamura, Tokyo (JP); Kazuhide Tanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 702 days.

(21) Appl. No.: 12/831,592

(22) Filed: Jul. 7, 2010

(65) Prior Publication Data

US 2011/0007365 A1    Jan. 13, 2011

(30) Foreign Application Priority Data

Jul. 8, 2009  (JP) .................................. 2009-162168

(51) Int. Cl.
*G06F 3/12* (2006.01)
*G06F 15/16* (2006.01)
*G06F 15/167* (2006.01)
*G06K 15/00* (2006.01)
*H04N 1/00* (2006.01)
*H04N 1/40* (2006.01)

(52) U.S. Cl.
USPC .......... 358/448; 358/1.15; 358/1.16; 358/1.6; 358/401; 709/201; 709/208; 709/212; 709/213; 709/217

(58) Field of Classification Search
USPC ........... 358/442, 1.9, 1.15, 1.1, 1.6, 540, 450, 358/501, 401, 448, 2.1, 3.01, 3.21, 3.24, 358/1.18, 530, 405; 709/223, 201, 203, 709/208, 212, 214, 217, 218, 219, 226, 230, 709/231, 238, 245, 248, 249, 250, 200; 707/607, 608, 622, 705, 706, 729, 758, 707/790, 791, 812, 821, 822, 825, 823, 707/899; 710/1, 3, 5, 7, 11, 20, 21, 33, 43, 710/51, 100, 105
See application file for complete search history.

(56) References Cited

U.S. PATENT DOCUMENTS

| 2005/0088681 A1* | 4/2005 | Hosoda ........................ 358/1.14 |
| 2006/0190496 A1* | 8/2006 | Tsunoda ....................... 707/200 |
| 2009/0070452 A1* | 3/2009 | Sato ............................. 709/223 |

FOREIGN PATENT DOCUMENTS

JP    2003-87479    3/2003

*Primary Examiner* — Ngon Nguyen
(74) *Attorney, Agent, or Firm* — Oblon, Spivak, McClelland, Maier & Neustadt, L.L.P.

(57) ABSTRACT

An image processing apparatus utilization system includes image processing apparatuses; an apparatus search unit configured to search for the image processing apparatuses; a capability information obtaining unit configured to obtain scanning capability information from the image processing apparatuses; a delivery setting receiving unit configured to receive a delivery setting for a first image processing apparatus; a first scenario generation unit configured to generate a scenario including the scanning capability information and the delivery setting for the first image processing apparatus; a second scenario generation unit configured to generate scenarios for second image processing apparatuses based on the scenario for the first image processing apparatus; a scenario storing unit configured to store the scenarios generated by the first and second scenario generation units; and an image delivery unit configured to send image data received from one of the image processing apparatuses according to the delivery setting in the scenario.

11 Claims, 22 Drawing Sheets

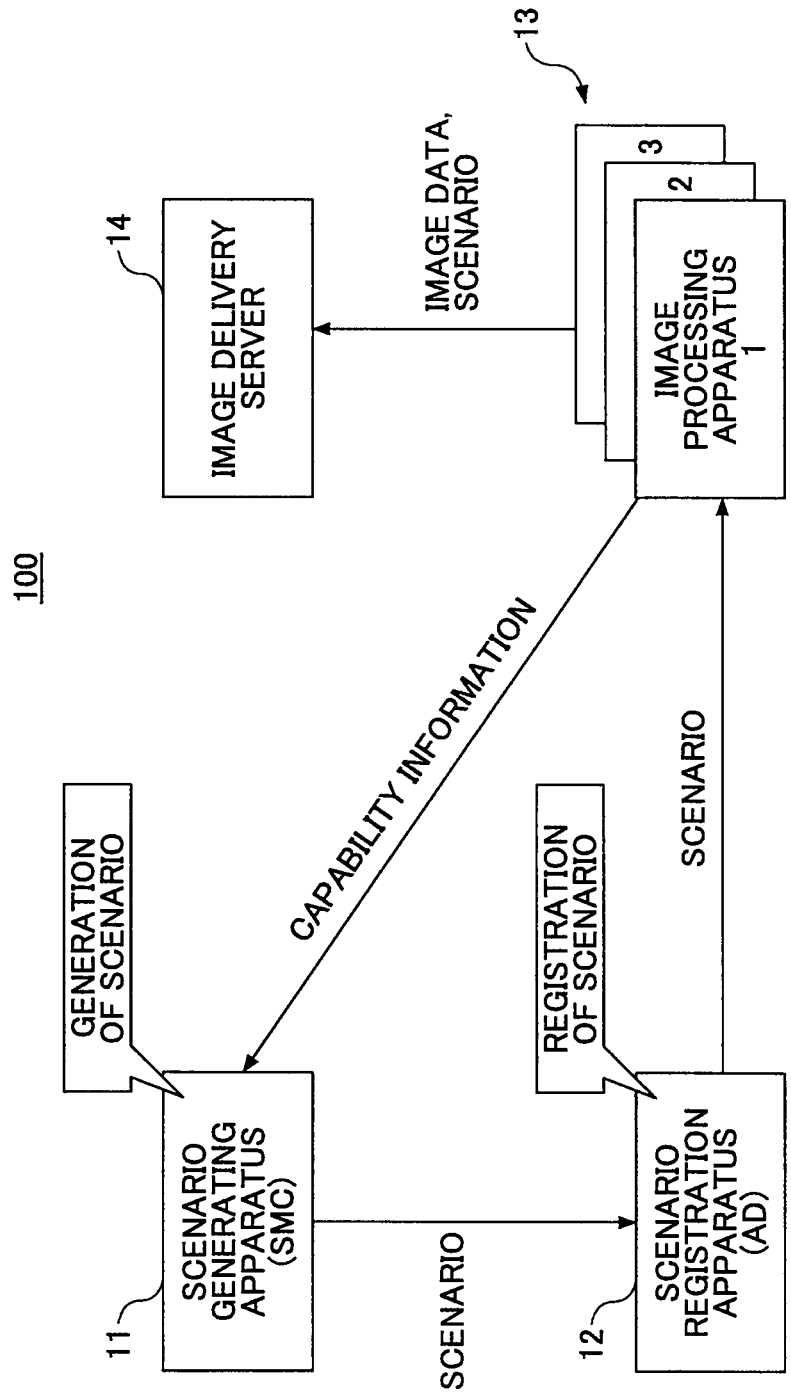

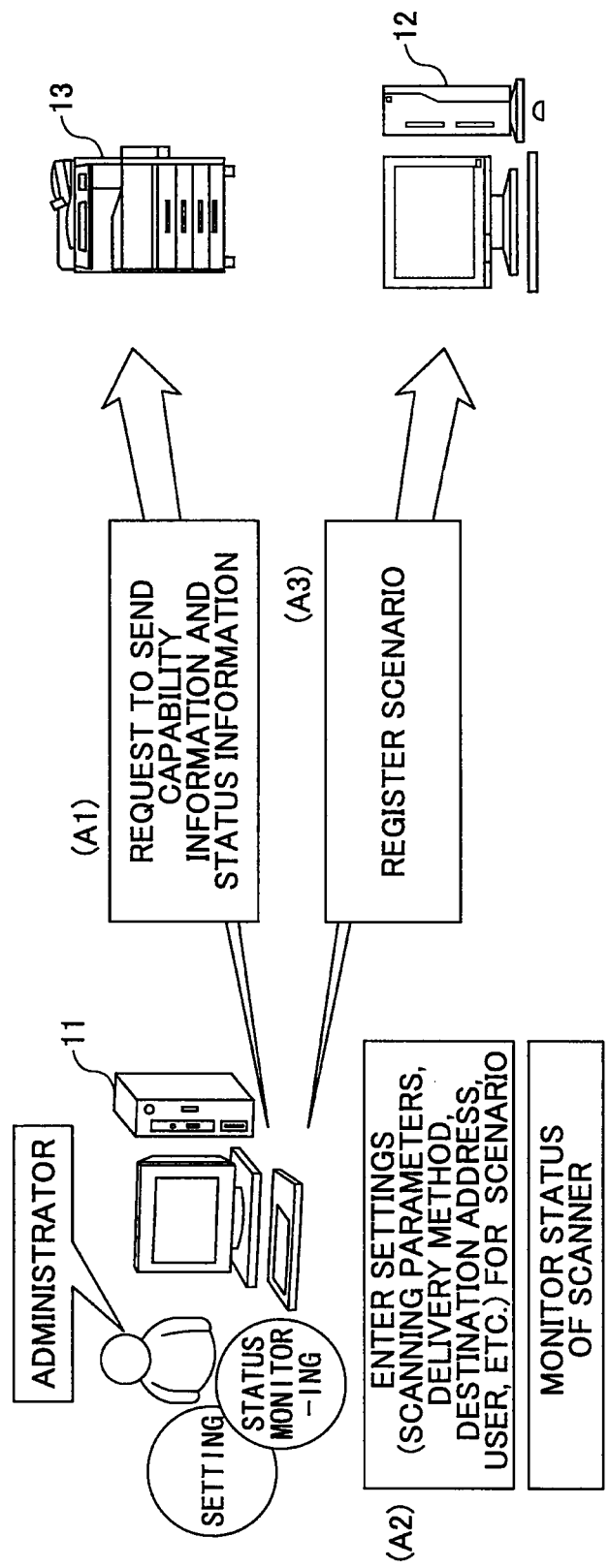

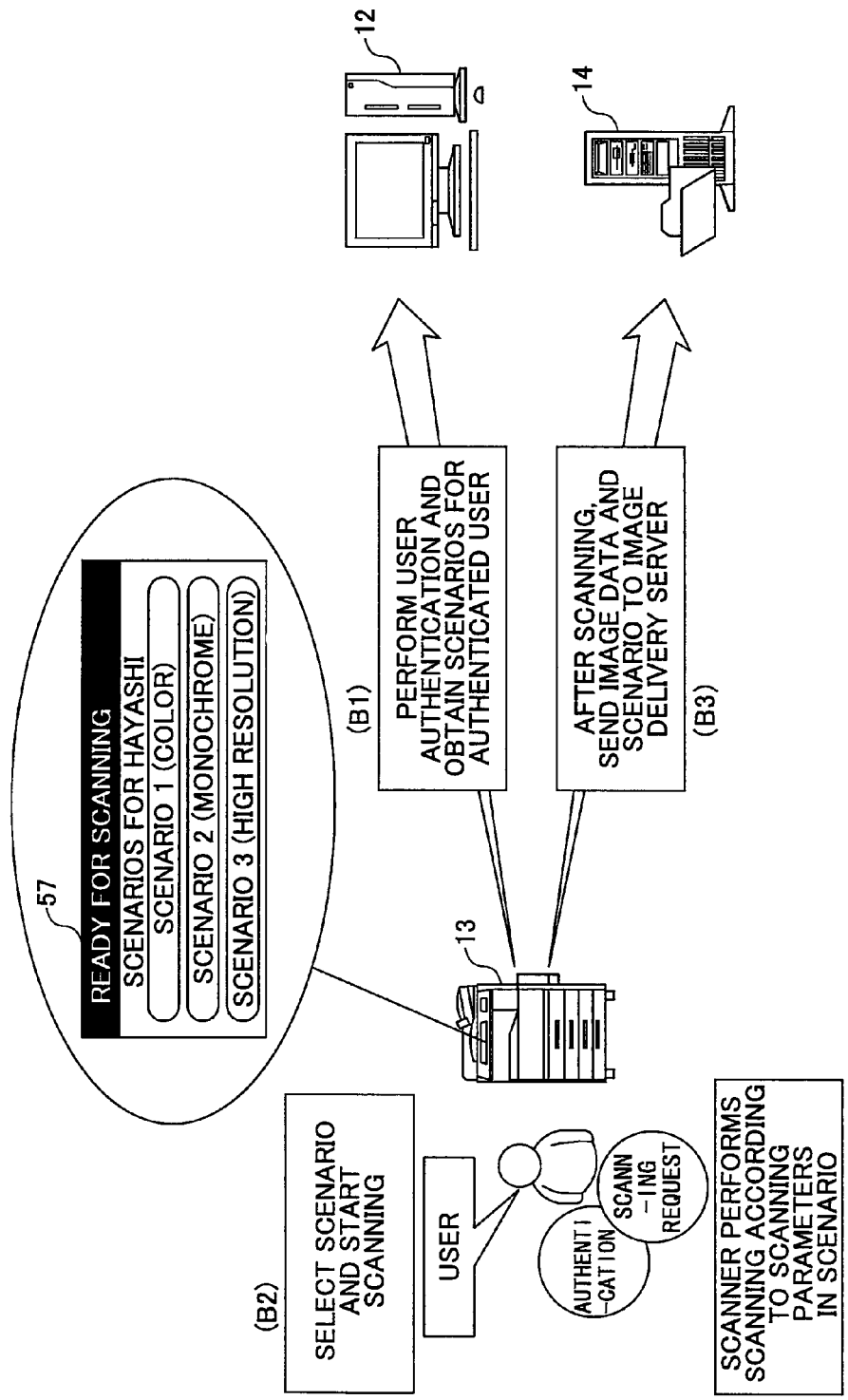

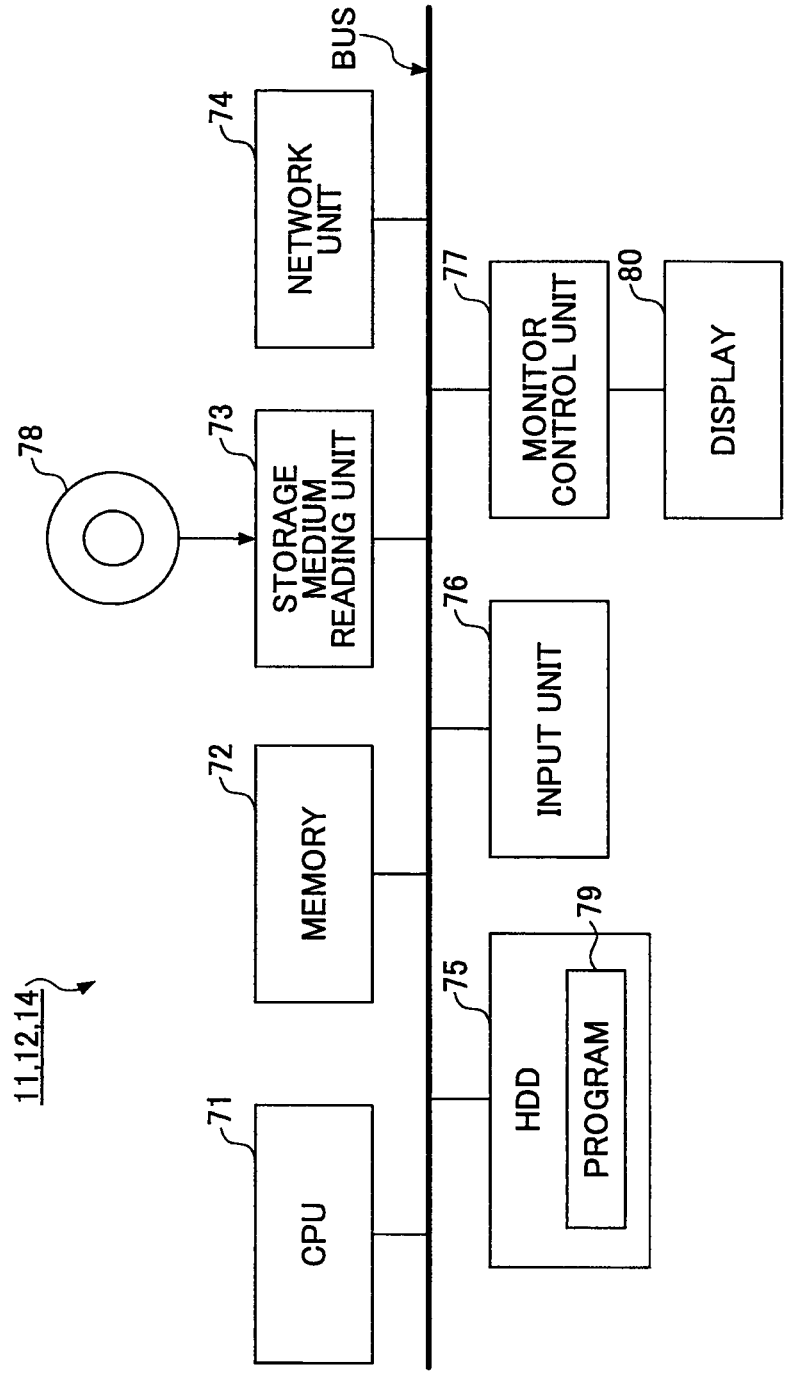

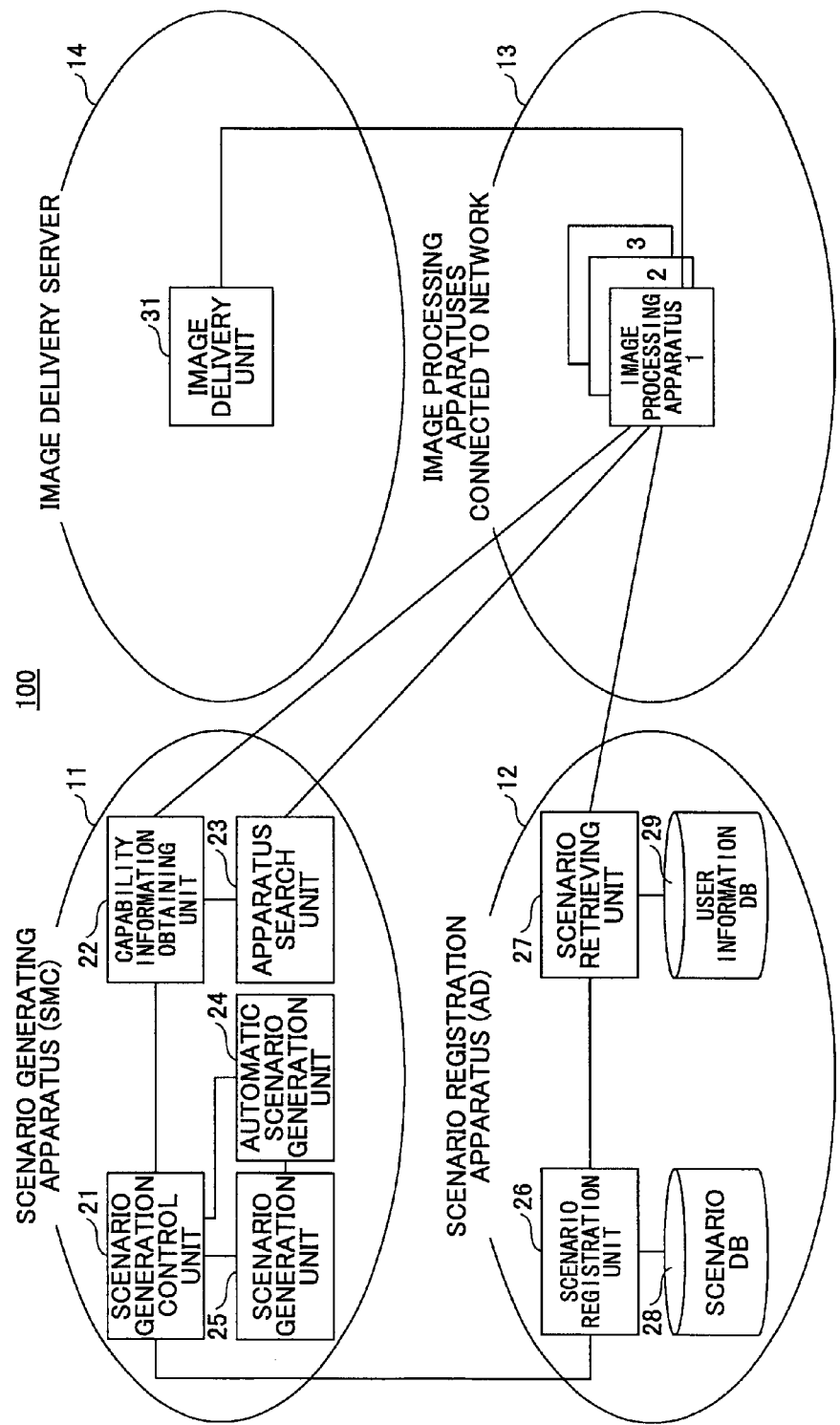

FIG.6

| INFORMATION ITEMS / REGISTERED SCENARIOS | SCANNING PARAMETERS ||| DELIVERY SETTINGS || USER NAME | PASSWORD | MODEL | APPARATUS IDENTIFIER |
|---|---|---|---|---|---|---|---|---|---|
| | RESOLUTION | DENSITY | COLOR MODE | PAPER SIZE | DELIVERY METHOD | DESTINATION ADDRESS | | | | |
| SCENARIO 1 | 200 dpi | AUTO | FULL COLOR | A4SEF | E-MAIL | xxx@yyy | AAA DDD EEE | ****** **** ******** | MFP-A | 111111 |
| SCENARIO 2 | 600 dpi | HIGH | MONOCHROME | B4SEF | SMB | xx/yy | BBB | **** | MFP-A | 222222 |
| SCENARIO 3 | 100 dpi | NORMAL | MONOCHROME | A3SEF | FTP | xx/zz | CCC | ******** | MFP-B | 333333 |

FIG.7

| REGISTRATION NUMBER | USER NAME | PASSWORD |
|---|---|---|
| 1 | AAA | xxx |
| 2 | BBB | yyy |
| 3 | CCC | zzz |

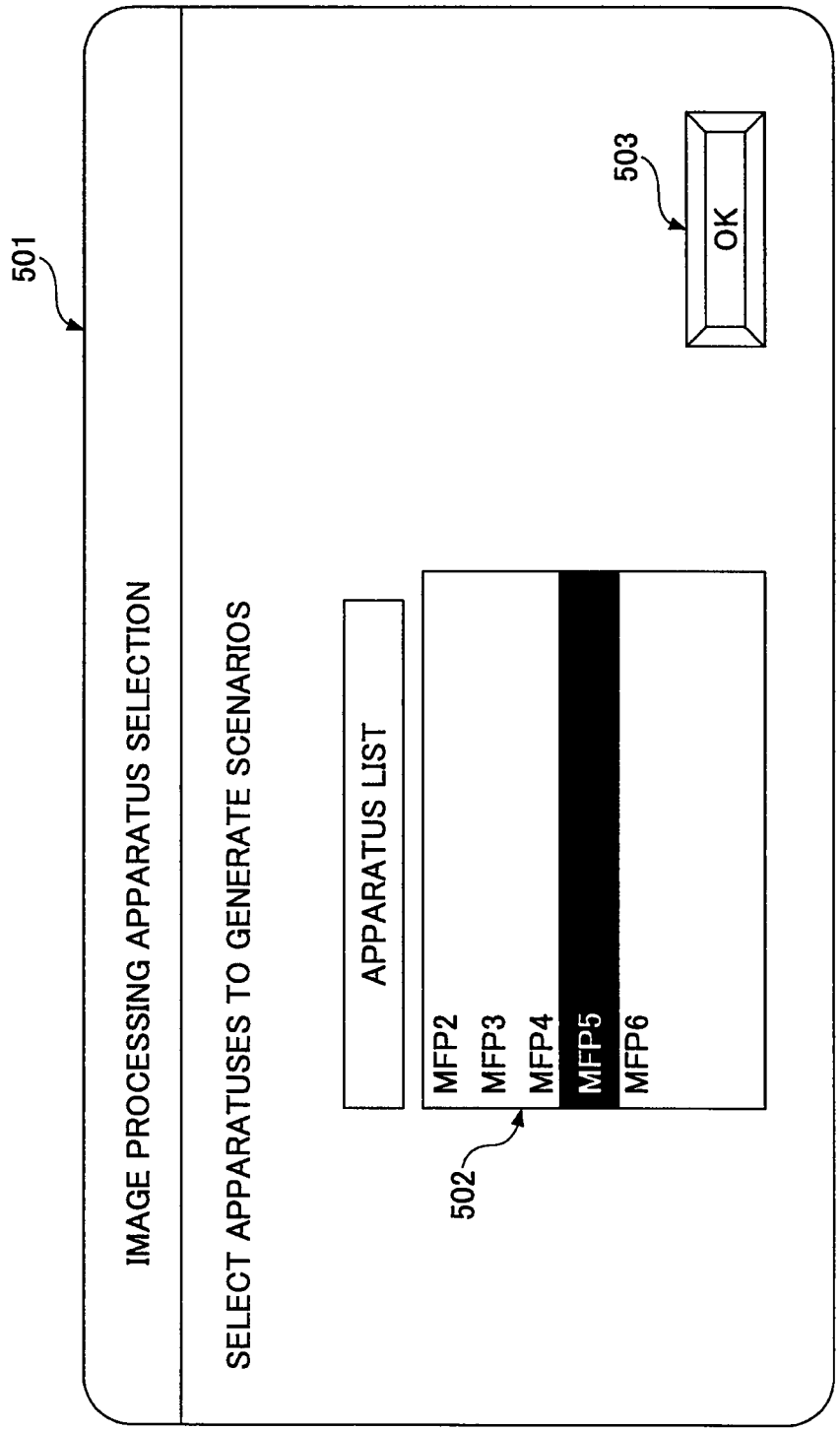

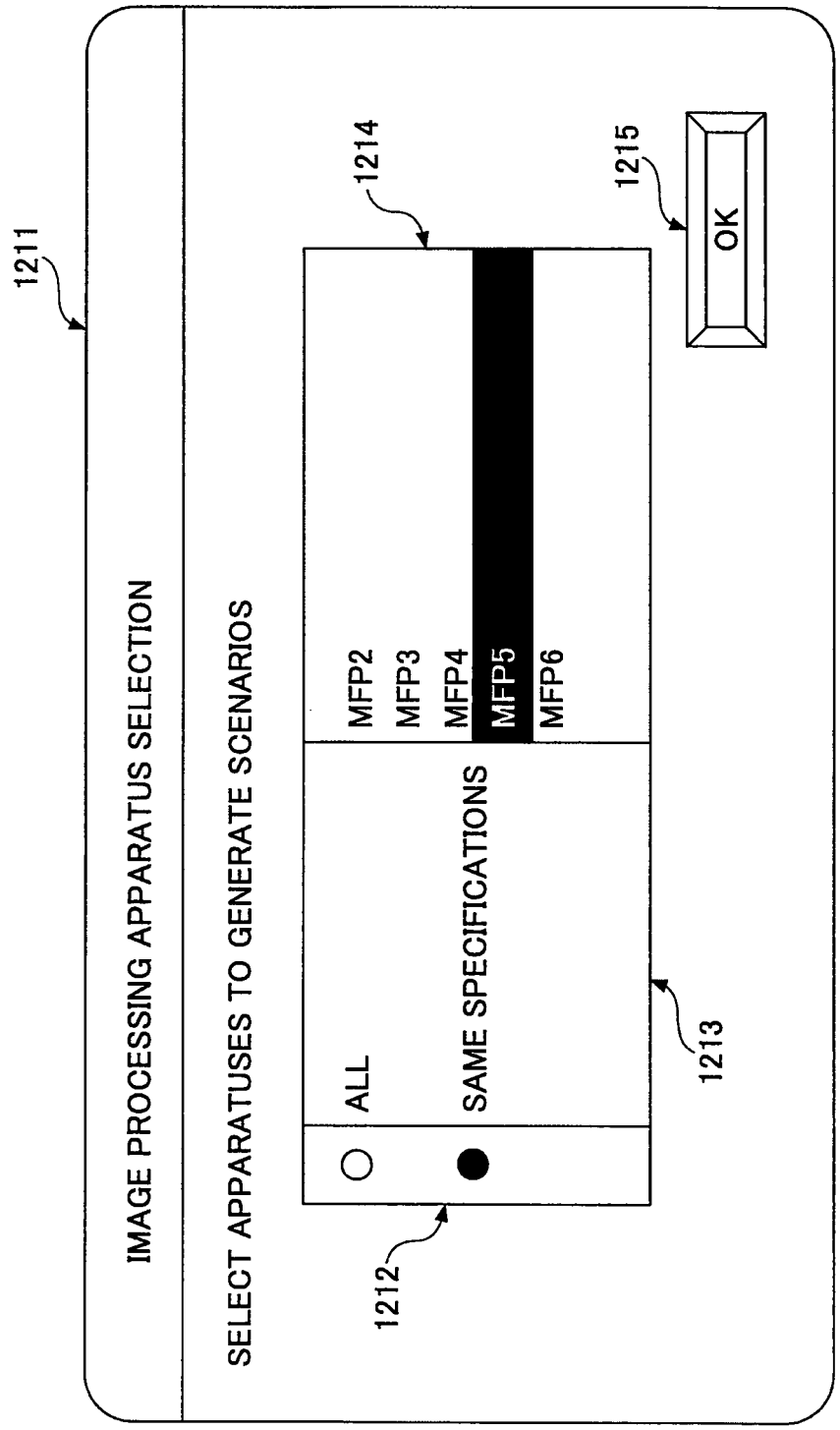

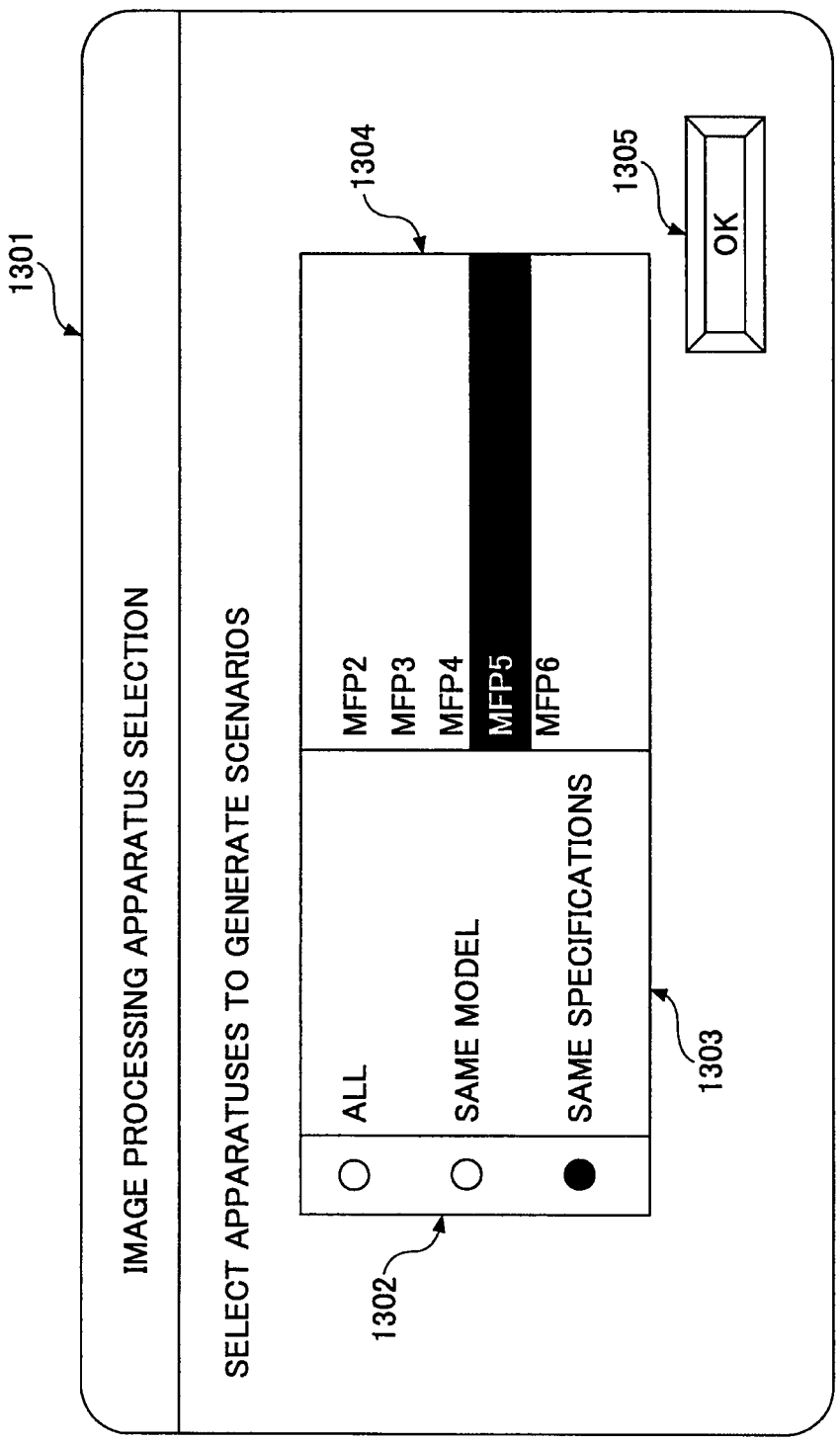

IMAGE PROCESSING APPARATUS UTILIZATION SYSTEM AND IMAGE PROCESSING APPARATUS UTILIZATION METHOD FOR AN IMAGE PROCESSING APPARATUS UTILIZATION SYSTEM INCLUDING IMAGE PROCESSING APPARATUSES, A SCENARIO GENERATION UNIT, A SCENARIO STORING UNIT, AND AN IMAGE DELIVERY UNIT THAT ARE CONNECTED VIA A NETWORK

BACKGROUND OF THE INVENTION

1. Field of the Invention

A certain aspect of the present invention relates to an image processing apparatus utilization system including image processing apparatuses connected via a network and a method for the image processing apparatus utilization system.

2. Description of the Related Art

Some network systems employ directory services (e.g., Active Directory). A directory service provides a searchable database containing information on users and devices such as printers and facsimile machines on a computer network such as a LAN. A document delivery system capable of centrally managing users and delivery methods may be implemented by using a directory service and a management server. Such a document delivery system enables an IT manager (or administrator) to register a "scenario" (information including scanning parameters, a delivery method, and a destination address) based on the apparatus information and status of a scanner or an apparatus (e.g., multifunction peripheral (MFP)) including a scanner that are being monitored by the management server and to register a user who is allowed to use the scenario. The user can scan a document using, for example, an MFP according to parameters specified in the scenario (see, for example, Japanese Patent Application Publication No. 2003-087479).

Japanese Patent Application Publication No. 2003-087479 discloses an image scanning system. In the disclosed image scanning system, a scanner sends an input user ID via a network to a scanning server, and the scanning server sends scanning information corresponding to the user ID to the scanner if the user ID is registered in an internal memory of the scanning server.

However, with a related-art directory service, a scenario registered in a scanner or a management server can be used only from a specified apparatus. Therefore, to use the same scenario from another apparatus, it is necessary to register the scenario again. In other words, if an IT manager registers scanning parameters in a scanning server from a scanner, the registered scanning parameters can be used only from the scanner used for the registration. Therefore, the IT manager needs to register the scanning parameters in the scanning server for each scanner to be used.

SUMMARY OF THE INVENTION

An aspect of the present invention provides an image processing apparatus utilization system including image processing apparatuses connected to a network; an apparatus search unit configured to search for the image processing apparatuses connected to the network; a capability information obtaining unit configured to obtain scanning capability information from the image processing apparatuses found by the apparatus search unit; a delivery setting receiving unit configured to receive a delivery setting for a first image processing apparatus; a first scenario generation unit configured to generate a scenario including the scanning capability information and the delivery setting for the first image processing apparatus; a second scenario generation unit configured to generate scenarios for second image processing apparatuses based on the scenario for the first image processing apparatus; a scenario storing unit configured to store the scenarios generated by the first and second scenario generation units, wherein each of the image processing apparatuses is configured to obtain the corresponding scenario from the scenario storing unit and to generate image data by scanning a document according to the scanning capability information in the obtained scenario; and an image delivery unit configured to receive the scenario and the image data from one of the image processing apparatuses and to send the image data according to the delivery setting in the scenario.

Another aspect of the present invention provides a method for an image processing apparatus utilization system including image processing apparatuses, a scenario generation unit, a scenario storing unit, and an image delivery unit that are connected via a network. The method includes the steps, performed by the scenario generation unit, of searching for the image processing apparatuses connected to the network, obtaining scanning capability information from the image processing apparatuses found in the searching step, receiving a delivery setting for a first image processing apparatus, generating a scenario including the scanning capability information and the delivery setting for the first image processing apparatus, and generating scenarios for second image processing apparatuses based on the scenario for the first image processing apparatus. The method further includes the step, performed by the scenario storing unit, of storing the scenarios generated by the scenario generation unit; the step, performed by one of the image processing apparatuses, of obtaining the corresponding scenario from the scenario storing unit and generating image data by scanning a document according to the scanning capability information in the obtained scenario; and the step, performed by an image delivery unit, of receiving the scenario and the image data from one of the image processing apparatuses and sending the image data according to the delivery setting in the scenario.

BRIEF DESCRIPTION OF THE DRAWINGS

FIG. 1 is a drawing illustrating an exemplary configuration of an image processing apparatus utilization system;

FIGS. 2A through 2C are drawings illustrating exemplary operations of an image processing apparatus utilization system;

FIG. 4 is a block diagram illustrating an exemplary hardware configuration of an SMC, an AD, and an image delivery server;

FIG. 5 is a functional block diagram of an image processing apparatus utilization system;

FIG. 6 is a table showing exemplary scenarios registered in a scenario DB;

FIG. 7 is a table showing exemplary user information stored in a user information DB;

FIGS. 17A through 17C are drawings illustrating exemplary screens displayed on a display of an SMC; and FIG. 18 is a drawing illustrating an exemplary screen displayed on a display of an SMC.

DESCRIPTION OF THE PREFERRED EMBODIMENTS

Preferred embodiments of the present invention are described below with reference to the accompanying drawings.

<<First Embodiment>>

An outline of an image processing apparatus utilization system is described below with reference to FIGS. 1 and 2. FIG. 1 is a drawing illustrating an exemplary configuration of an image processing apparatus utilization system 100 according to a first embodiment of the present invention. The image processing apparatus utilization system 100 includes a scenario generating apparatus (SMC) 11, a scenario registration apparatus (AD) 12, image processing apparatuses 1, 2, 3, . . . (may be collectively called an image processing apparatus(es) 13 when distinction is not necessary), and an image delivery server 14. The SMC 11 generates a scenario. The AD 12 stores and registers the scenario. The image processing apparatus 13 provides capability information (e.g., support for color scanning, maximum resolution, etc.) to be used by the SMC 11 to generate the scenario, scans a document, and sends image data of the scanned document together with the scenario to the image delivery server 14. The image delivery server 14 receives the image data and the scenario from the image processing apparatus 13 and processes the image data according to the scenario (e.g., sends the image data to an information processing apparatus).

In this embodiment, it is assumed that the SMC 11, the AD 12, and the image delivery server 14 are implemented by separate computers. However, functions of the SMC 11, the AD 12, and the image delivery server 14 may be implemented by one or two computers. For example, functions of the SMC 11, the AD 12, and the image delivery server 14 may be implemented by application programs running on a computer.

In the descriptions below, an operator operating the SMC 11 to register a scenario is called an administrator, and an operator operating the image processing apparatus 13 to use a scenario is called a user. However, this distinction is only for descriptive purposes and an administrator may be called a user in some context. Also, although it is assumed in this embodiment that a scenario includes scanning parameters, a scenario may instead or in addition include copying parameters and/or printing parameters.

Figure 2C:
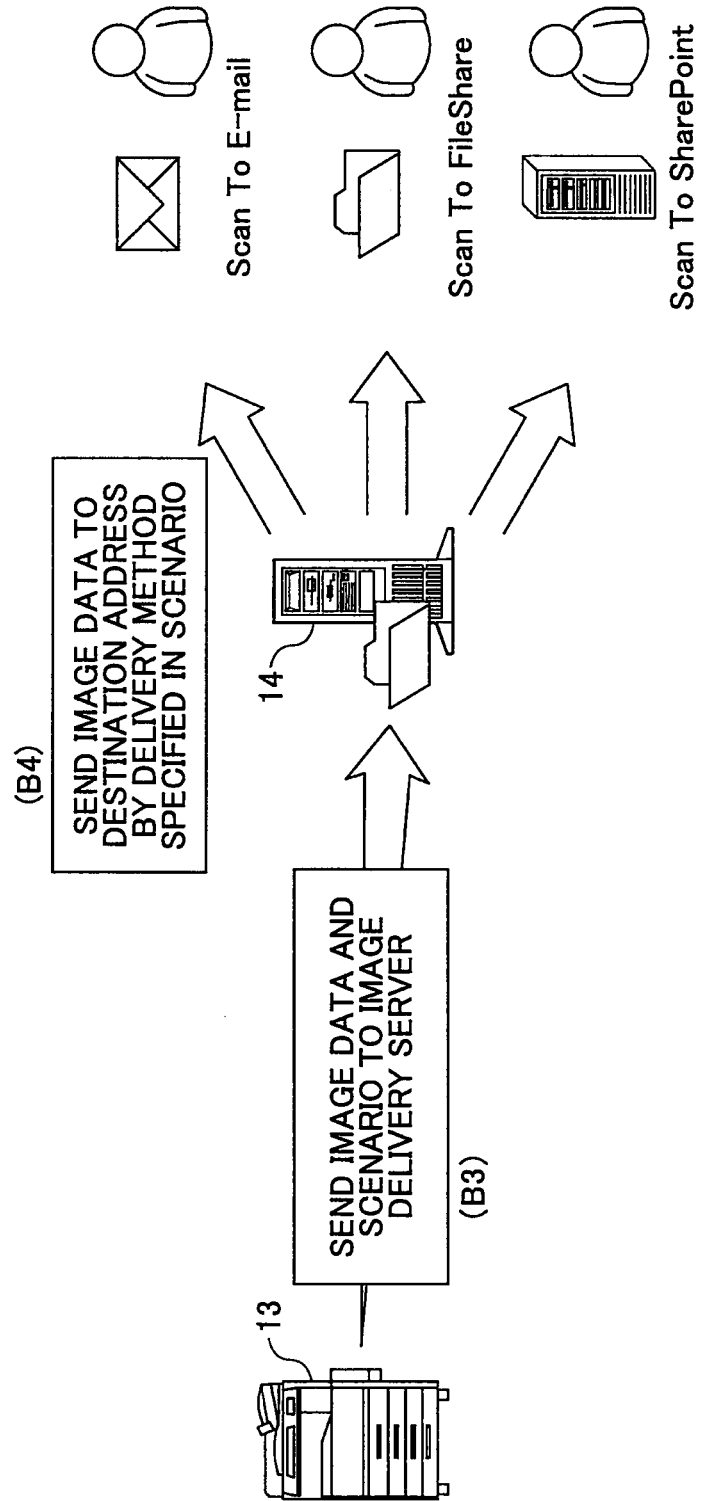

FIGS. 2A through 2C are drawings illustrating exemplary operations of the image processing apparatus utilization system 100. A process of registering a scenario is described below with reference to FIG. 2A.

(A1)

The administrator operates the SMC 11 to generate a scenario. A scenario, for example, includes scanning parameters, delivery settings, a user name(s), a password(s), a model, and an apparatus identifier.

The SMC 11 includes a user interface called a "scanner management console" implemented by a function of an operating system (OS) (e.g., Windows (registered trademark) Vista/7) or an application program. The scanner management console is an example of a user interface that allows the administrator to communicate with the image processing apparatus 13 and the AD 12 and to make various settings. The SMC 11 and the image processing apparatus 13 communicate with each other using a given protocol (e.g., WS-EWS).

The SMC 11 needs capability information of the image processing apparatus 13 to generate a scenario. Therefore, in response to an operation by the administrator, the SMC 11 requests the image processing apparatus 13 to send its capability information and status information.

(A2)

In response to the request from the SMC 11, the image processing apparatus 13 sends its capability information to the SMC 11. The SMC 11 may obtain the capability information of the image processing apparatus 13 when the administrator operates the SMC 11 to generate a scenario or before the administrator operates the SMC 11.

The SMC 11 displays the capability information received from the image processing apparatus 13 on a display. The administrator sets scanning parameters for the image processing apparatus 13 (for each of the image processing apparatuses 13) within the capability indicated by the capability information. The administrator also specifies delivery settings and a user name and a password for a user who uses the scanning parameters.

(A3)

Then, the SMC 11 sends the scenario including the scanning parameters, the delivery settings, and other information to the AD 12. The AD 12 stores (registers) the scenario sent from the SMC 11. The AD 12 manages, for example, PCs, scanners, printers, copiers, and facsimile machines connected to multiple networks in a hierarchical structure of domains (units for managing users and computers). For example, the AD 12 enables to determine a scanner connectable to a PC. Through the above process, a scenario is registered in the AD 12.

As described later in detail, once a scenario is generated for a first image processing apparatus, the SMC 11 of the image processing apparatus utilization system 100 of this embodiment can generate scenarios for other image processing apparatuses by duplicating the scenario generated for the first image processing apparatus. In other words, once a scenario is registered for a first image processing apparatus, it is possible to automatically register equivalent scenarios for other image processing apparatuses.

A process of using a scenario is described below with reference to FIGS. 2B and 2C.

(B1)

The user inputs authentication information (e.g., a password) to the image processing apparatus 13, and the image processing apparatus 13 obtains scenarios the user is allowed to use from the AD 12. Scenarios are associated with users who are allowed to use the scenarios. Therefore, only those scenarios associated with the user are sent from the AD 12 to the image processing apparatus 13.

(B2)

The user selects one of the scenarios on an operations panel 57 (see FIG. 3) of the image processing apparatus 13 and presses a start key to scan a document. The image processing apparatus 13 scans the document according to the selected scenario.

(B3)

Then, the image processing apparatus 13 sends image data of the scanned document and the selected scenario to the image delivery server 14. The image processing apparatus 13 and the image delivery server 14 communicate with each other using a given protocol (e.g., WS-EWS). The image delivery server 14 compares the scenario received from the image processing apparatus 13 with the corresponding scenario stored in the AD 12 to determine whether they are the same and thereby verifies the received scenario.

(B4)

The image delivery server 14 delivers the image data according to the delivery settings (a delivery method and a destination address) in the scenario. Exemplary delivery methods include "Scan-To-Email", "Scan-To-FileShare", and "Scan-To-SharePoint" as shown in FIG. 2C.

<Hardware Configuration of Image Processing Apparatus 13>

Figure 3:
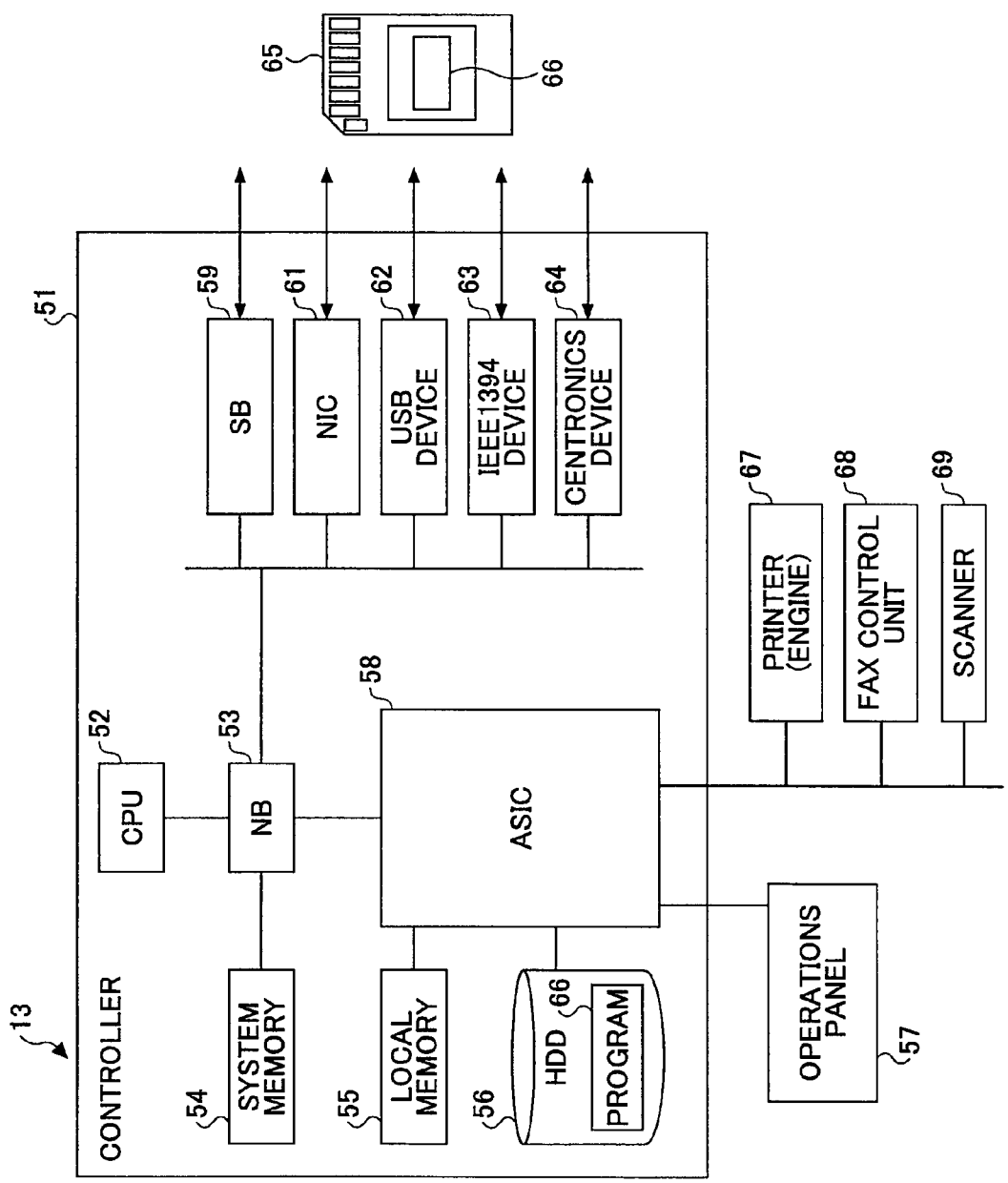
FIG. 3 is a block diagram illustrating an exemplary hardware configuration of an image processing apparatus.

FIG. 3 shows an exemplary hardware configuration of the image processing apparatus 13. The image processing apparatus 13 is a multifunction peripheral (MFP) including a scanner 69, a printer 67, and a fax control unit 68. The image processing apparatus 13 is not necessarily an MFP. Any apparatus including at least the scanner 69 may be used as the image processing apparatus 13.

The image processing apparatus 13 also includes a controller 51 and an operations panel 57. The controller 51 includes a CPU 52, a system memory 54, a northbridge (NB) 53, a southbridge (SB) 59, an application specific integrated circuit (ASIC) 58, a local memory 55, an HDD 56, a network interface card (NIC) 61, a USB device 62, an IEEE1394 device 63, and a centronics device 64.

A storage medium 65 can be attached and detached to and from the USB device 62. A program 66 stored in the storage medium 65 is installed into the HDD 56. Also, programs may be installed from a server (not shown) via the NIC 61 into the HDD 56.

The CPU 52 controls the entire image processing apparatus 13. For example, the CPU 53 executes a process on an operating system (OS). The NB 53 is a bridge. The SB 59 is a bridge for connecting a ROM and peripheral devices to a PCI bus. The system memory 54 is used, for example, as a graphics memory of the image processing apparatus 13. The local memory 55 is used, for example, as an image buffer for copying and a code buffer.

The ASIC 58 is an IC for image processing and includes hardware components for image processing. The HDD 56 is an example of a storage (secondary storage unit) for storing image data, document data, programs, font data, and so on. The NIC 61 is an interface for connecting the image processing apparatus 13 to a network. The USB device 62, the IEEE1394 device 63, and the centronics device 64 are interfaces of different standards and are used, for example, to receive print data from a PC.

The operations panel 57 receives user inputs and displays information for the user. The operations panel 57, for example, includes a touch panel and keys arranged around the touch panel. The printer 67 is a monochrome and/or color plotter and forms an image page by page on a recording medium (paper, etc.) based on print job data or image data obtained by the scanner 69. For example, the printer 67 may be implemented by an electrophotographic plotter that forms a toner image on a photoconductive drum using a laser beam, transfers the toner image onto paper, fixes the toner image on the paper with heat and pressure applied by a fixing unit, and outputs the paper.

The scanner 69, for example, optically scans a document placed on a contact glass, performs A/D conversion on reflected light to obtain digital data, and performs image processing including image area separation, under color removal, gamma conversion, isolated point removal, color space conversion, and resizing on the digital data to obtain image data with a specified resolution.

The fax control unit 68 is connected via a network control unit (NCU) to a public telecommunication network and sends and receives facsimile messages according to the G3/G4 protocols. The fax control unit 68 may include a memory for temporarily storing facsimile data received while the image processing apparatus 13 is turned off.

<Hardware Configuration of SMC 11, AD 12, and Image Delivery Server 14>

Each of the SMC 11, the AD 12, and the image delivery sever 14 may be implemented by a personal computer or a workstation. Therefore, computers with the same hardware configuration may be used for the SMC 11, the AD 12, and the image delivery sever 14. In the descriptions below, the SMC 11 is taken as an example.

FIG. 4 is a block diagram illustrating an exemplary hardware configuration of the SMC 11, the AD 12, and the image delivery server 14. The SMC 11 includes, as hardware components, a CPU 71 and a memory 72 (including a ROM and a RAM) that are connected via a bus. Also, an HDD 75 that is a mass storage, an input unit 76 including a mouse and a keyboard, a monitor control unit 77 for connecting a display 80 such as an LCD or a CRT, and a storage medium reading unit 73 for reading a storage medium 78 such as an optical disk are connected via interfaces to the bus. Further, a network unit 74 for communicating with external devices via a network such as the Internet or via a USB interface is connected to the bus.

The HDD 75 of the SMC 11 stores a program 79 for generating a scenario. Meanwhile, the HDD 75 of the AD 12 stores a program 79 for registering a scenario; and the HDD 75 of the image delivery server 13 stores a program 79 for delivering image data. The program 79 is read from the storage medium 78 by the storage medium reading unit 73 or downloaded from a network such as the Internet, and is installed in the HDD 75. With the program 79 installed, the SMC 11 can generate a scenario automatically or according to a request from the administrator.

The CPU 71 of the SMC 11 reads the program 79 from the HDD 75 and executes the program 79 using the RAM of the memory 72 as a working memory to implement a scenario generation control unit 21, a scenario generation unit 25, a capability information obtaining unit 22, an automatic scenario generation unit 24, and an apparatus search unit 23 shown in FIG. 5.

Similarly, the CPU 71 of the AD 12 reads the program 79 from the HDD 75 and executes the program 79 using the RAM of the memory 72 as a working memory to implement a scenario registration unit 26 and a scenario retrieving unit 27 shown in FIG. 5. Also, the CPU 71 of the image delivery server 14 reads the program 79 from the HDD 75 and executes the program 79 using the RAM of the memory 72 as a working memory to implement an image delivery unit 31 shown in FIG. 5.

When, for example, communicating using TCP/IP, the network unit 74 establishes a communication connection in the physical layer and the data link layer between the SMC 11 (the AD 12 or the image delivery server 14) and the image processing apparatus 13 or between the SMC 11 and the AD 12. For example, the AD 12 and the image processing apparatus 13 communicate with each other using the lightweight directory access protocol (LDAP) that is an upper layer of TCP/IP. The LDAP is widely used for directory services. In this embodiment, the image processing apparatus 13 uses the LDAP to search for a scenario registered in the AD 12.

As described above, the SMC 11, the AD 12, and the image delivery server 14 may be implemented by one computer. Alternatively, the SMC 11 and the AD 12 may be implemented by one computer and the image delivery server 14 may be implemented by a separate computer. Also, the SMC 11 and the image delivery server 14 may be implemented by one computer and the AD 12 may be implemented by a separate computer. Further, the AD 12 and the image delivery server 14 may be implemented by one computer and the SMC 11 may be implemented by a separate computer.

<Functional Configuration of Image Processing Apparatus Utilization System 100>

FIG. 5 is a functional block diagram of the image processing apparatus utilization system 100. As shown in FIG. 5, the SMC 11 includes the scenario generation control unit 21, the capability information obtaining unit 22, the apparatus search unit 23, the automatic scenario generation unit 24, and the scenario generation unit 25.

<Scenario>

A configuration of a scenario is described below with reference to FIG. 6. FIG. 6 is a table showing exemplary scenarios registered in a scenario DB 28 of the AD 12 (see FIG. 5). Each scenario, for example, includes scanning parameters, delivery settings, a user name(s), a password(s), a model, and an apparatus identifier. The scanning parameters include a resolution, a density, a color mode, and a paper size. The delivery settings include a delivery method and a destination address.

Available scanning parameters may vary depending on the capability of the image processing apparatus 13. The user name corresponds to a user name registered in the AD 12. The password is associated with the user name registered in the AD 12. Combinations of user names and passwords are registered in a user information DB 29 of the AD 12 as shown in FIG. 7.

The apparatus identifier is a unique code assigned to each image processing apparatus 13. The apparatus identifier in a scenario registered in the scenario DB 28 indicates the corresponding image processing apparatus 13 for which the scenario is generated. In other words, the scenario is usable from the image processing apparatus 13 indicated by the apparatus identifier.

When receiving a scenario from the AD 12, the image processing apparatus 13 sets parameters for operating the scanner 69 according to the resolution, the density, the color mode, and the paper size in the scenario. This configuration makes it possible to scan a document and generate image data using the image processing apparatus 13 without the need for the user to set the resolution, the density, the color mode, and the paper size by operating the operations panel 57. Whether the user is allowed or not allowed to change all or a part of the scanning parameters defined by the scenario by operating the operations panel 57 depends on the design policy of the directory service.

When receiving image data and a scenario, the image delivery server 14 delivers the image data according to the delivery settings in the scenario. Thus, a scenario defines parameters for generating and delivering image data.

<SMC 11>

Referring back to FIG. 5, the capability information obtaining unit 22 obtains capability information of the image processing apparatuses 13. The capability information may correspond to the scanning parameters in a scenario. Therefore, the capability information and/or the scanning parameters may be called scanning capability information. To obtain the capability information, the capability information obtaining unit 22 needs to obtain installation information of the image processing apparatuses 13 connected to the network. The installation information is used by the capability information obtaining unit 22 to communicate with the corresponding image processing apparatus 13 connected to a network and includes, for example, the apparatus identifier, the model, the MAC address, and the IP address of the image processing apparatus 13. The capability information obtaining unit 22 requests the apparatus search unit 23 to provide the installation information of the image processing apparatuses 13 in a network to be searched.

The apparatus search unit 22 obtains the installation information of the image processing apparatuses 13 in the network to be searched. More specifically, the apparatus search unit 23 searches for the image processing apparatuses 13 in a network range specified by the administrator and requests the installation information using, for example, the WS-EWS protocol from the found image processing apparatuses 13. The apparatus search unit 23 may be configured to search for only the image processing apparatuses 13 having a scanning function.

The simple network management protocol (SNMP) may be used by the apparatus search unit 23 to search for the image processing apparatuses 13. SNMP is a protocol used to monitor devices connected to a network and thereby to manage a network system. The apparatus search unit 23, for example, broadcasts a search request in the network.

Each of the image processing apparatuses 13 retains apparatus information in a database called a management information base 2 (MIB2). When receiving a search request, each of the image processing apparatuses 13 extracts installation information from the apparatus information and sends the installation information to the apparatus search unit 23. Thus, in this embodiment, the SMC 11 corresponds to an SNMP manager and the image processing apparatus 13 corresponds to an SNMP agent.

When receiving the installation information, the apparatus search unit 23 sends the received installation information to the capability information obtaining unit 22. Based on the installation information (particularly, the apparatus identifier, the model, the MAC address, and the IP address), the capability information obtaining unit 22 requests the capability information from the image processing apparatuses 13 in the network. To request and obtain the capability information, the capability information obtaining unit 22 may use the WS-EWS protocol, SNMP, and MIB2 as in the above search process, or may use a different protocol such as HTTP or FTP.

The scenario generation control unit 21 controls a process of generating a scenario. Specifically, the scenario generation control unit 21 obtains the capability information of the image processing apparatus 13 from the capability information obtaining unit 22 and requests the scenario generation unit 25 to generate a scenario based on the capability information. Assuming that the administrator is to generate a scenario for the image processing apparatus 1, the scenario generation control unit 21 sends scenario information including settings or parameters specified by the administrator to the scenario generation unit 25. The scenario generation unit 25 generates a scenario by converting the scenario information into a predetermined format and stores the generated scenario in the memory 72 and/or the HDD 75. The scenario generation control unit 21 also requests the scenario registration unit 26 of the AD 12 to register the scenario generated by the scenario generation unit 25.

Assuming that scenarios for the image processing apparatuses 2, 3, . . . other than the image processing apparatus 1 (hereafter called the image processing apparatuses n (n=2, 3, 4, . . . )) are also to be generated, the scenario generation control unit 21 sends the scenario generated by the scenario generation unit 25 to the automatic scenario generation unit 24. The automatic scenario generation unit 24 in turn requests the scenario generation unit 25 to generate scenarios for the image processing apparatuses n by duplicating the scenario generated for the image processing apparatus 1 by the administrator. Thus, the automatic scenario generation unit 24 automatically generates scenarios for the image processing apparatuses n in cooperation with the scenario generation unit 25.

The above process (or configuration) for automatically generating scenarios is just an example. The automatic scenario generation unit 24 may instead be configured to automatically generate scenarios by itself. In this embodiment, the administrator generates a scenario for an image processing apparatus by operating the SMC 11 and the SMC 11 automatically generates scenarios for other image processing apparatuses based on the scenario generated by the administrator.

For example, the scenario generation control unit 21 automatically generates scenarios for the image processing apparatuses n in one of the following methods:

a. Generates scenarios without taking into account capabilities of the image processing apparatuses n.

b. Generates scenarios taking into account capabilities of the image processing apparatuses n:

b1. Generates scenarios for the image processing apparatuses n that are the same model as the image processing apparatus 1; or b2. Generates scenarios for the image processing apparatuses n with the same specifications as the image processing apparatus 1.

In the method "b", the scenario generation control unit 21 determines whether to generate scenarios for the image processing apparatuses n and when it is determined to generate scenarios, the scenario generation control unit 21 requests the automatic scenario generation unit 24 to generate the scenarios. Taking into account the capabilities of the image processing apparatuses n as in the method "b" makes it possible to prevent generation of scenarios including parameters that are out of the capabilities of the image processing apparatuses n.

The scenario generation control unit 21 may also be configured to determine whether the image processing apparatuses n are the same model as the image processing apparatus 1 or whether the image processing apparatuses n have the same specifications as the image processing apparatus 1. For example, if the image processing apparatus 1 is capable of color printing but (some of) the image processing apparatuses n are incapable of color printing, the scenario generation control unit 21 determines not to generate scenarios for (the some of) the image processing apparatuses n. As another example, if the image processing apparatus 1 is capable of scanning at 600 dpi but (some of) the image processing apparatuses n are capable of scanning at up to 400 dpi, the scenario generation control unit 21 determines not to generate scenarios for (the some of) the image processing apparatuses n.

<AD 12>

As shown in FIG. 5, the AD 12 includes the scenario registration unit 26, the scenario retrieving unit 27, the scenario DB 28 connected to the scenario registration unit 26, and the user information DB 29 connected to the scenario retrieving unit 27. The scenario registration unit 26 of the AD 12 receives scenarios from the scenario generation control unit 21 of the SMC 11 and registers the received scenarios in the scenario DB 28. Here, "registration" indicates storing the scenarios such that they are searchable from the image processing apparatus 13. For example, the scenario registration unit 26 stores the scenarios in the scenario DB 28 that is implemented in the HDD 75 or a solid state drive (SDD).

The scenario retrieving unit 27 retrieves a scenario specified by the image processing apparatus 13 from the scenario DB 28. The image processing apparatus 13 requests the scenario retrieving unit 27 to retrieve a scenario using search keys including, for example, the apparatus identifier of the image processing apparatus 13 and the user name of a user using the image processing apparatus 13.

The scenario retrieving unit 27 uses user information stored in the user information DB 29 to authenticate users. FIG. 7 is a table showing exemplary user information stored in the user information DB 29. The user information includes registration numbers for uniquely identifying users, user names, and passwords that are associated with each other. The user information provided in the AD 12 is used to authenticate users of scenarios and is different from user information that is registered in the respective image processing apparatuses 13 (and used for authentication of users of the image processing apparatuses 13).

When a user is successfully authenticated based on a user name and a password, the scenario retrieving unit 27 retrieves from the scenario DB 28 one or more scenarios associated with the user name as shown in FIG. 6, and sends the retrieved scenarios to the image processing apparatus 13.

<Image Processing Apparatus 13>

The image processing apparatus 13 displays a list of scenarios received from the AD 12 on the operations panel 57. When the user selects one of the scenarios, the image processing apparatus 13 sends the selected scenario to a scanning application. The scanning application sets the scanning parameters of the image processing apparatus 13 based on the scenario. When the user presses, for example, a start key, the scanner 69 scans a document according to the scanning parameters set by the scanning application based on the scenario.

Then, the image processing apparatus 13 sends image data of the scanned document and the scenario to the image delivery server 14.

<Image Delivery Server 14>

The image delivery unit 31 of the image delivery server 14 refers to the delivery settings in the scenario and delivers the image data to the specified destination address in the specified delivery method (FTP, server message block (SMB), e-mail, or so on).

<Automatic Generation of Scenarios: Case 1>

In case 1 (method "a" described above), scenarios are automatically generated without taking into account capabilities of the image processing apparatuses n.

A process of registering scenarios is described below with reference to FIG. 8. Steps S11 through S26 are common to all cases (cases 1-3) and steps S27 through S30 are unique to case 1.

Figure 8:
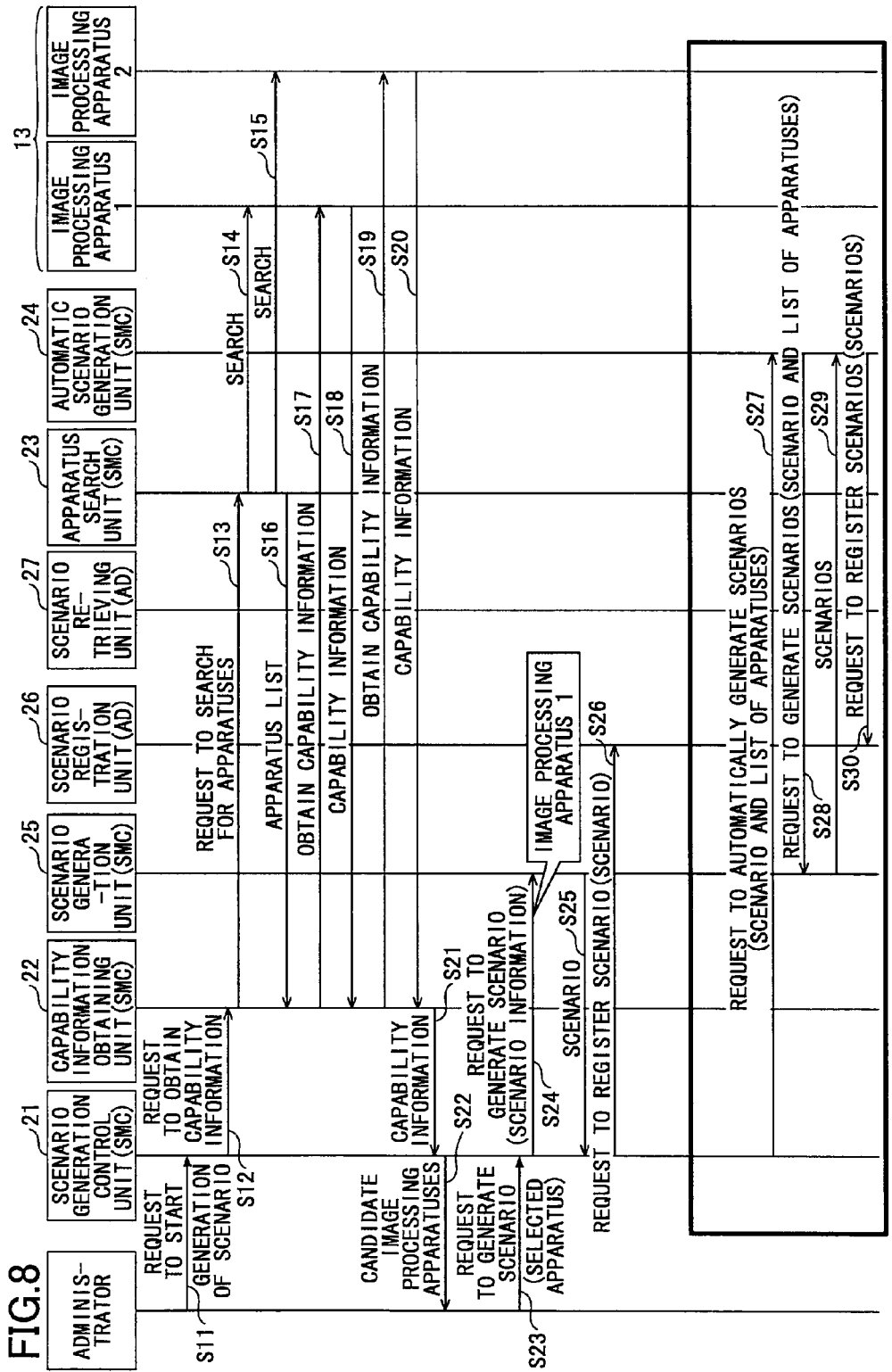
FIG. 8 is a sequence chart showing an exemplary process of registering scenarios in an image processing apparatus utilization system.
Figure 9:
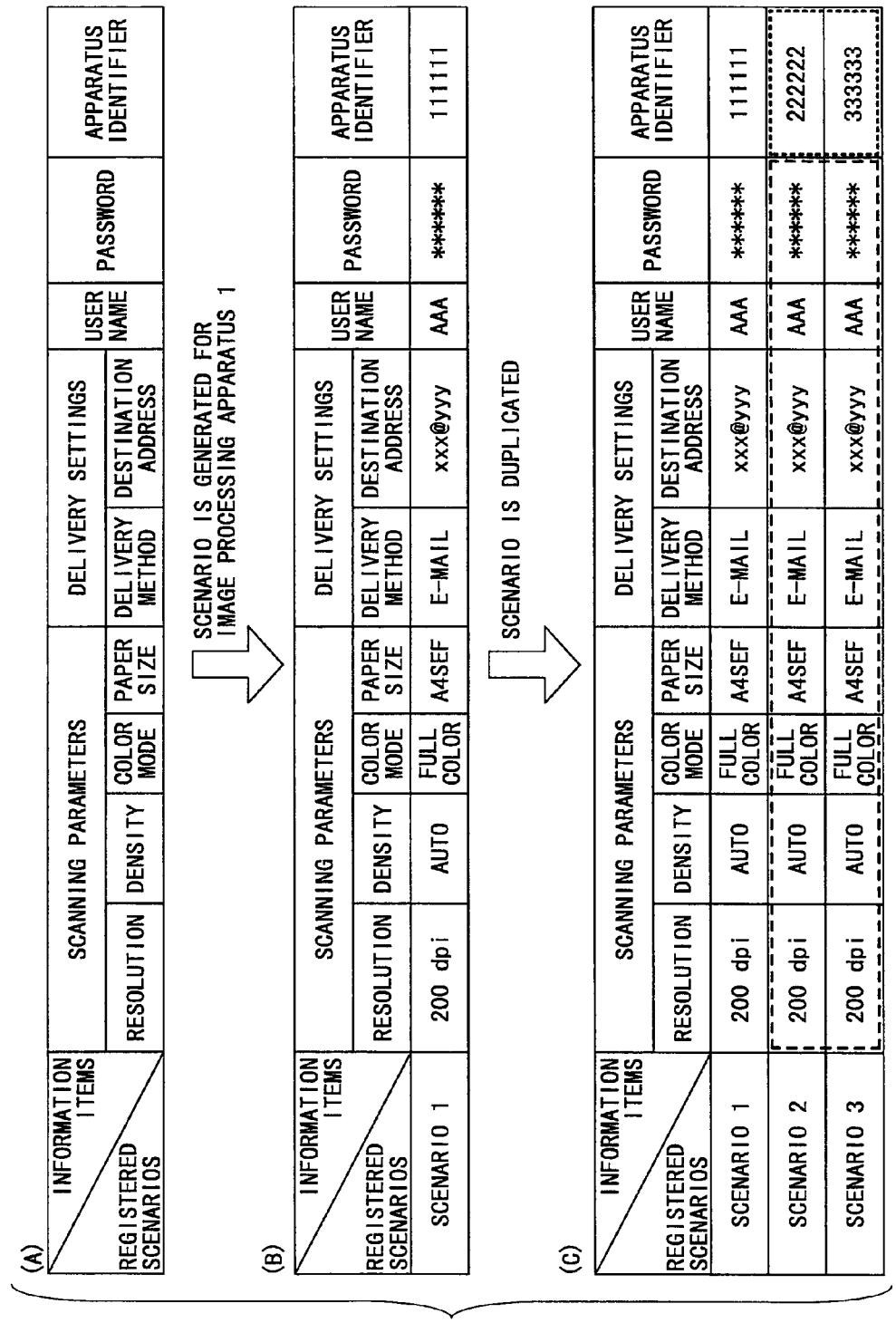
FIG. 9 is a drawing illustrating a process of generating scenarios to be registered in a scenario DB.

FIG. 8 is a sequence chart showing an exemplary process of registering scenarios in the image processing apparatus utilization system 100. FIG. 9 is a drawing illustrating a process of generating scenarios to be registered in the scenario DB 28.

In FIG. 8, the administrator operates the SMC 11 to activate the scanner management console and requests the scenario generation control unit 21 to start generation of a scenario (S11). For example, when the administrator presses (or selects) a button on the scanner management console by using a mouse or a keyboard to request to start generation of a scenario, the scenario generation control unit 21 receives the request.

The scenario generation control unit 21 requests the capability information obtaining unit 22 to obtain capability information of all image processing apparatuses 13 connected to the network (S12). The capability information obtaining unit 22 in turn requests the apparatus search unit 23 to search for the image processing apparatuses 13 connected via the network to the image processing apparatus utilization system 100 (S13).

The apparatus search unit 23 searches for the image processing apparatuses 13 connected to the image processing apparatus utilization system 100 (S14, S15). Although only the image processing apparatuses 1 and 2 are shown in FIG. 8 for brevity, the number of image processing apparatuses is not limited to a specific value. In the descriptions below, it is assumed that the image processing apparatuses 1 through 3 are detected. When detected by the apparatus search unit 23 (when receiving a search request from the apparatus search unit 23), each of the image processing apparatuses 13 sends installation information to the apparatus search unit 23. Then, the apparatus search unit 23 generates an apparatus list including the installation information (apparatus identifiers, models, MAC addresses, and IP addresses) of the detected image processing apparatuses 13.

The apparatus search unit 23 sends the apparatus list to the capability information obtaining unit 22 (S16).

Based on the apparatus list, the capability information obtaining unit 22 requests the image processing apparatuses 13 to send their capability information (S17, S19).

In response, each of the image processing apparatuses 13 reads its own capability information from, for example, MIB2 and sends the capability information to the capability information obtaining unit 22 (S18, S20). Through the above steps, the capability information obtaining unit 22 obtains capability information of the image processing apparatuses 13 connected to the network.

Next, the capability information obtaining unit 22 sends the obtained capability information of the image processing apparatuses 13 to the scenario generation control unit 21 (S21).

Based on the capability information, the scenario generation control unit 21 displays candidate image processing apparatuses for the administrator (S22). More specifically, the scenario generation control unit 21 displays a list including the apparatus identifiers and models of the image processing apparatuses 13 on the display 80 of the SMC 11. The administrator can select (e.g., click on) one of the apparatus identifiers or the models to display the capability information of the corresponding one of the image processing apparatuses 13 on the display 80.

The administrator selects one of the image processing apparatuses 13 (here, it is assumed that the image processing apparatus 1 is selected) and thereby requests the scenario generation control unit 21 to generate a scenario for the image processing apparatus 1 (S23). When requested, the scenario generation control unit 21 displays the capability information of the selected image processing apparatus 1 on the display 80. With the capability information, the administrator is able to generate a scenario (or scenario information) within the capability of the image processing apparatus 1.

The administrator specifies scanning parameters including a resolution, a density, a color mode, and a paper size. For example, the SMC 11 may be configured to display optional values as a pull-down list for each of the resolution, the density, the color mode, and the paper size within the capability of the image processing apparatus 1 so that the administrator can specify a parameter by selecting a value from the pull-down list. Alternatively, the administrator may directly specify a value for each parameter.

The administrator also specifies a delivery method, a destination address, a user name, and a password. Here, it is assumed that parameters to be set are known to the administrator.

The scenario generation control unit 21 sends information (hereafter called scenario information) specified by the administrator to the scenario generation unit 25 and thereby requests the scenario generation unit 25 to generate a scenario (S24). The scenario generation unit 25 checks the scenario information, for example, to determine whether all necessary information items are specified and whether illegal characters are used. Then, the scenario generation unit 25 converts the scenario information into a predetermined format to generate a scenario and sends the generated scenario to the scenario generation control unit 21 (S25). The scenario generation control unit 21 may be configured to display the scenario on the display 80 for confirmation by the administrator.

In the next step, the scenario generation control unit 21 sends the scenario to the scenario registration unit 26 of the AD 12 and requests the scenario registration unit 26 to register the scenario (S26). In response, the scenario registration unit 26 registers (stores) the scenario in the scenario DB 28. Through the above steps, a scenario (scenario 1) as shown by FIG. 9 (B) is generated.

<Steps S27 Through S30>

A process of automatically generating scenarios is described below. The scanner management console includes the program 79. Therefore, the SMC 11 automatically performs steps S27 through S30 following step S25.

The scenario generation control unit 21 requests the automatic scenario generation unit 24 to generate scenarios for image processing apparatuses n (in this example, the image processing apparatuses 2 and 3) other than the image processing apparatus 1 for which the scenario has been generated by the administrator (or according to the request from the administrator) (S27). In requesting automatic generation of scenarios, the scenario generation control unit 21 sends the automatic scenario generation unit 24 the scenario generated for the image processing apparatus 1, the apparatus identifier of the image processing apparatus 1, and the apparatus identifiers of the image processing apparatuses n for which scenarios are to be automatically generated. The scenario generation control unit 21 may also send the capability information of the respective image processing apparatuses 13 to the automatic scenario generation unit 24.

The automatic scenario generation unit 24 in turn requests the scenario generation unit 25 to generate scenarios for the image processing apparatuses n (S28). In requesting generation of scenarios, the automatic scenario generation unit 24 sends the scenario generation unit 25 the scenario generated for the image processing apparatus 1, the apparatus identifier of the image processing apparatus 1, and the apparatus identifiers of the image processing apparatuses n for which scenarios are to be automatically generated.

The scenario generation unit 25 generates scenarios for the image processing apparatuses n specified by the automatic scenario generation unit 24 (S29). More specifically, the scenario generation unit 25 generates scenarios for the image processing apparatuses n by duplicating the scenario of the image processing apparatus 1 and changing only the apparatus identifier in the duplicated scenario. The scenario generation unit 25 sends the generated scenarios to the automatic scenario generation unit 24.

The automatic scenario generation unit 24 sends the scenarios for the image processing apparatuses n to the scenario registration unit 26 of the AD 12 (S30). As a result, the same scenarios (with different apparatus identifiers) as the scenario of the image processing apparatus 1 are registered for the image processing apparatuses n by the scenario registration unit 26.

FIG. 9 (C) shows scenarios 2 and 3 generated by duplicating the scenario 1 and registered in the scenario DB 28. As shown in FIG. 9 (C), information items other than the apparatus identifiers in the scenarios 2 and 3 are the same as those in the scenario 1. When registered, the automatically generated scenarios 2 and 3 become available to the image processing apparatuses 2 and 3. However, in case 1, the image processing apparatuses 2 and 3 may not be able to actually use the scenarios 2 and if, for example, their specifications are different from those of the image processing apparatus 1. In other words, the user can use the scenarios 2 and 3 for the image processing apparatuses 2 and 3 if the capabilities of the image processing apparatuses 2 and 3 are greater than or equal to the capability of the image processing apparatus 1.

<Automatic Generation of Scenarios: Case 2>

In case 2 (method "b1" described above), scenarios are automatically generated for the image processing apparatuses n that are the same model as the image processing apparatus 1. Here, "the same model" indicates that the image processing apparatuses n have the same model name or the model number as that of the image processing apparatus 1. Image processing apparatuses with minor differences, for example, in firmware versions may be treated as the same model. In this embodiment, whether image processing apparatuses are the same model is determined based on model names.

Figure 10:
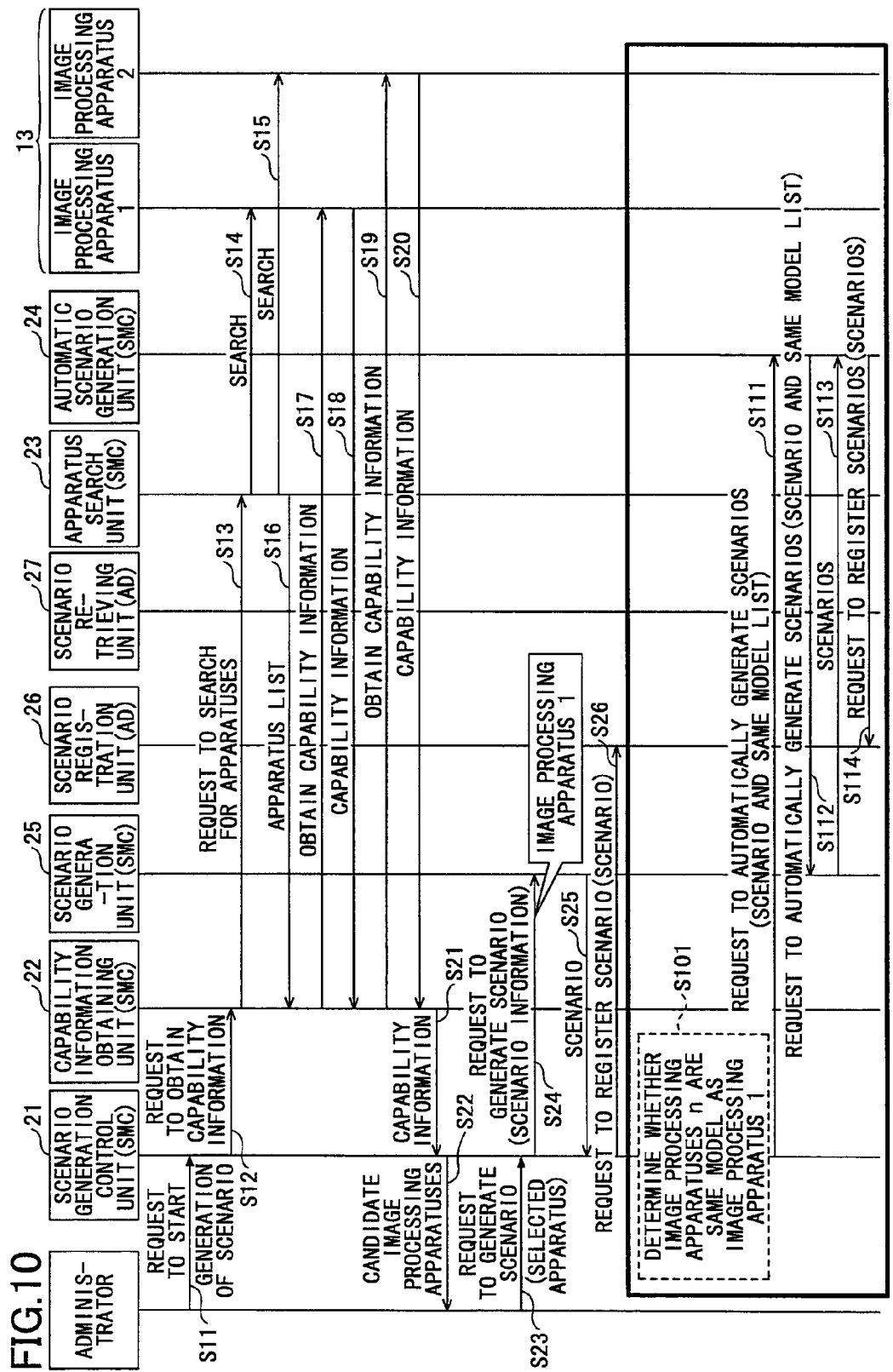
FIG. 10 is a sequence chart showing an exemplary process of registering scenarios in an image processing apparatus utilization system.

A process of registering scenarios is described below with reference to FIG. 10. In FIG. 10, the same reference numbers are used for steps that are the same as those in FIG. 8. Since steps S11 through S26 are substantially the same as those in FIG. 8, their descriptions are omitted here.

<Steps S101 Through S114>

Through the process up to step S26, the scenario 1 for the image processing apparatus 1 is registered in the scenario DB 28 as shown in FIG. 9 (B).

Next, the scenario generation control unit 21 determines whether capability information is sent from the image processing apparatuses n that are the same model as the image processing apparatus 1 for which the scenario 1 has been generated (S101). The scenario generation control unit 21 uses model information (e.g., model name) contained in the installation information and/or the capability information to determine whether the image processing apparatuses n are the same model as the image processing apparatus 1.

Figure 11:
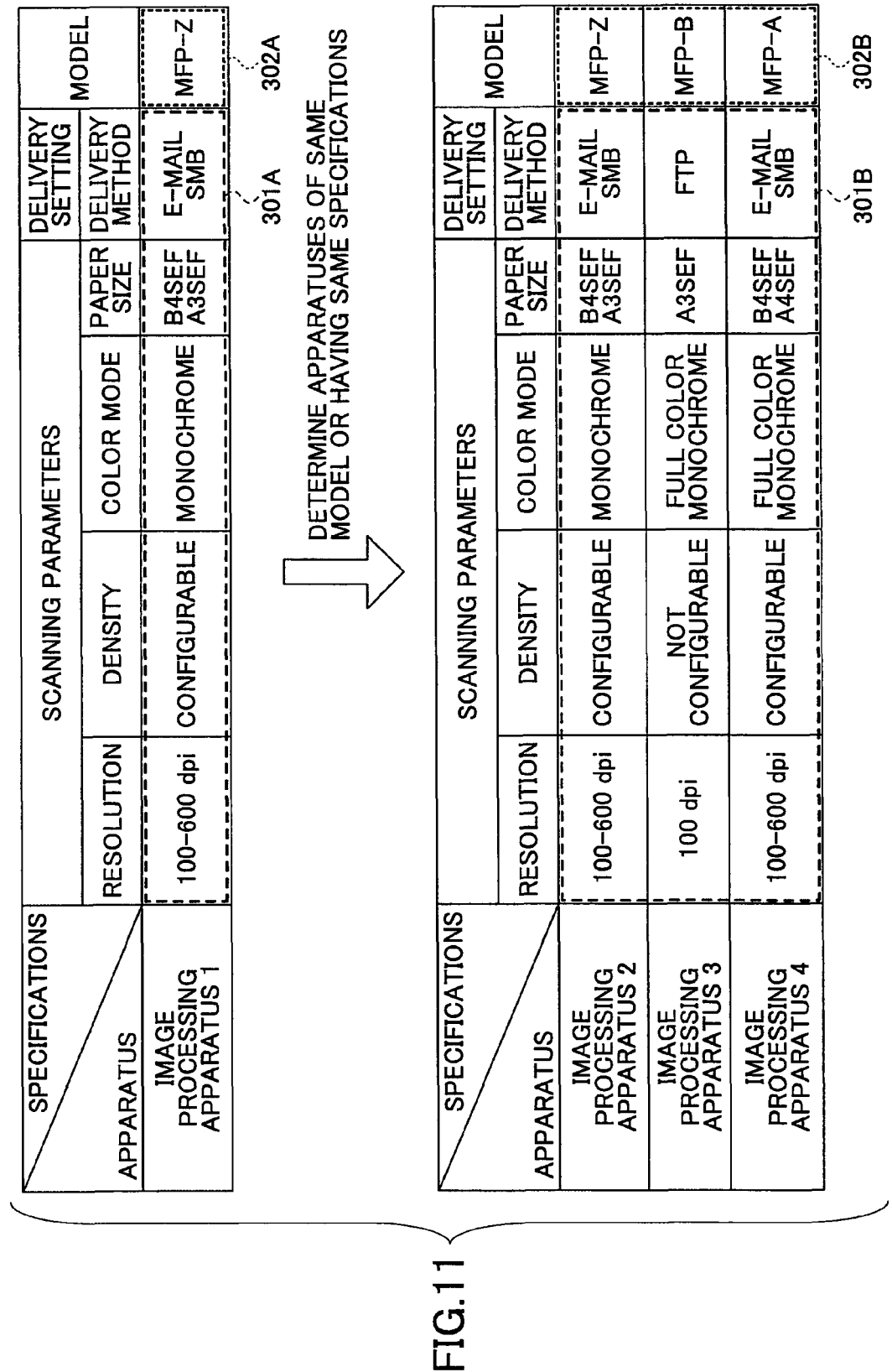
FIG. 11 is a drawing used to describe a process of determining whether image processing apparatuses are the same model or have the same specifications.

FIG. 11 is a drawing used to describe a process of determining whether image processing apparatuses are the same model or have the same specifications. FIG. 11 shows information items obtained from the installation information and/or the capability information of image processing apparatuses 1 through 4 and used to determine whether the image processing apparatuses 1 through 4 are the same model or have the same specifications. An information item 302A of the image processing apparatus 1 and an information item 302B of each of the image processing apparatuses 2 through 4 are used by the scenario generation control unit 21 to determine whether they are the same model. Information items 301A of the image processing apparatus 1 and information items 301B of each of the image processing apparatuses 2 through 4 are used by the scenario generation control unit 21 to determine whether they have the same specifications. In this example, the scenario generation control unit 21 determines that the image processing apparatus 1 and the image processing apparatus 2 having the same model name "MFP-Z" are the same model. The scenario generation control unit 21 generates a same model list including (e.g., the identifier of) the image processing apparatus 2 that has been determined to be the same model as the image processing apparatus 1. Here, it is assumed that image processing apparatuses of the same model can properly scan a document according to the same scenario.

Referring back to FIG. 10, the scenario generation control unit 21 sends the same model list to the automatic scenario generation unit 24 to request generation of a scenario for the image processing apparatus 2 (S111). The same model list includes the scenario 1 generated for the image processing apparatus 1, the apparatus identifier of the image processing apparatus 1, and the apparatus identifier of the image processing apparatus 2. The scenario generation control unit 21 may also send the capability information of the image processing apparatuses 1 and 2 to the automatic scenario generation unit 24.

The automatic scenario generation unit 24 sends the same model list to the scenario generation unit 21 and requests the scenario generation unit 25 to generate a scenario for the image processing apparatus 2 (S112).

The scenario generation unit 25 generates a scenario for the image processing apparatus 2 specified by the automatic scenario generation unit 24 (S113). More specifically, the scenario generation unit 25 generates a scenario for the image processing apparatus 2 by duplicating the scenario of the image processing apparatus 1 and changing only the apparatus identifier in the duplicated scenario. The scenario generation unit 25 sends the generated scenario to the automatic scenario generation unit 24.

The automatic scenario generation unit 24 sends the scenario for the image processing apparatus 2 to the scenario registration unit 26 of the AD 12 (S114). As a result, the same scenario (with a different apparatus identifier) as the scenario of the image processing apparatus 1 is registered for the image processing apparatus 2 by the scenario registration unit 26.

Automatically generating scenarios only for image processing apparatuses of the same model makes it possible to prevent generation of unusable scenarios and thereby makes it possible to reduce the amount of memory necessary to store the scenarios.

<Automatic Generation of Scenarios: Case 3>

In case 3 (method "b2" described above), scenarios are automatically generated for the image processing apparatuses n having the same specifications as those of the image processing apparatus 1. Here, "having the same specifications" indicates that the same scanning parameters, i.e., the resolution, the density, the color mode, and the paper size, as those of the image processing apparatus 1 can be set for the image processing apparatuses n.

Figure 12:
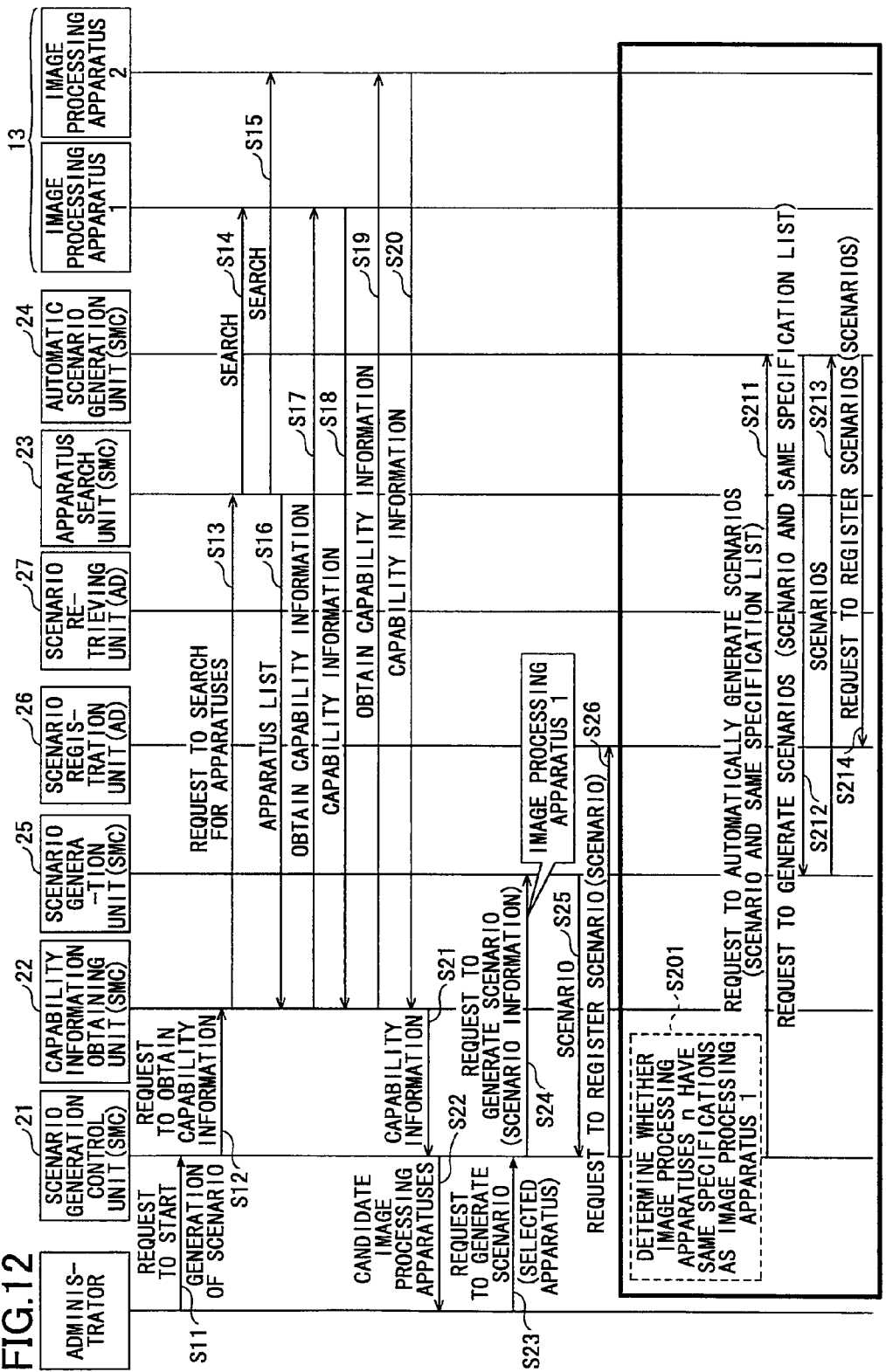
FIG. 12 is a sequence chart showing an exemplary process of registering scenarios in an image processing apparatus utilization system.

A process of registering scenarios is described below with reference to FIG. 12. In FIG. 12, the same reference numbers are used for steps that are the same as those in FIG. 8. Since steps S11 through S26 are substantially the same as those in FIG. 8, their descriptions are omitted here.

<Steps S201 Through S214>

Through the process up to step S26, the scenario 1 for the image processing apparatus 1 is registered in the scenario DB 28 as shown in FIG. 9 (B).

Next, the scenario generation control unit 21 determines whether capability information is sent from the image processing apparatuses n that have the same specifications as those of the image processing apparatus 1 for which the scenario 1 has been generated (S201). The specifications are contained in the capability information.

More specifically, the scenario generation control unit 21 determines whether the image processing apparatuses 2 through 4 have the same specifications as those of the image processing apparatus 1 by comparing the scanning parameters (the resolution, the density, the color mode, and the paper size) and the delivery method of the image processing apparatus 1 with those of the image processing apparatuses 2 through 4. With the exemplary specifications shown in FIG. 11, the scenario generation control unit 21 determines that the image processing apparatus 2 has the same specifications, i.e., the same scanning parameters and delivery method, as those of the image processing apparatus 1. The scenario generation control unit 21 generates a same specification list including (e.g., the identifier of) the image processing apparatus 2 that has been determined to have the same specifications as those of the image processing apparatus 1. Here, it is assumed that image processing apparatuses with the same specifications can properly scan a document according to the same scenario.

Instead of comparing all the specifications, only important items (parameters) in the specifications may be compared. For example, only the resolution and the color mode may be compared. Here, if an image processing apparatus has higher specifications (higher capability) than those of the image processing apparatus 1, the image processing apparatus can scan a document using the same parameters as those for the image processing apparatus 1. Therefore, an image processing apparatus having higher specifications than those of the image processing apparatus 1 may be treated as having the same specifications as the image processing apparatus 1.

Referring back to FIG. 12, the scenario generation control unit 21 sends the same specification list to the automatic scenario generation unit 24 to request generation of a scenario for the image processing apparatus 2 (S211). The same specification list includes the scenario 1 generated for the image processing apparatus 1, the apparatus identifier of the image processing apparatus 1, and the apparatus identifier of the image processing apparatus 2. The scenario generation control unit 21 may also send the capability information of the image processing apparatuses 1 and 2 to the automatic scenario generation unit 24.

The automatic scenario generation unit 24 sends the same specification list to the scenario generation unit 25 and requests the scenario generation unit 25 to generate a scenario for the image processing apparatus 2 (S212).

The scenario generation unit 25 generates a scenario for the image processing apparatus 2 specified by the automatic scenario generation unit 24 (S213). More specifically, the scenario generation unit 25 generates a scenario for the image processing apparatus 2 by duplicating the scenario of the image processing apparatus 1 and changing only the apparatus identifier in the duplicated scenario. The scenario generation unit 25 sends the generated scenario to the automatic scenario generation unit 24.

The automatic scenario generation unit 24 sends the scenario for the image processing apparatus 2 to the scenario registration unit 26 of the AD 12 (S214). As a result, the same scenario (with a different apparatus identifier) as the scenario of the image processing apparatus 1 is registered for the image processing apparatus 2 by the scenario registration unit 26.

Automatically generating scenarios only for image processing apparatuses having the same specifications makes it possible to prevent generation of unusable scenarios and thereby makes it possible to reduce the amount of memory necessary to store the scenarios.

As described above, once a scenario is generated for a first image processing apparatus, the image processing apparatus utilization system 100 of this embodiment can automatically generate and register scenarios for other image processing apparatuses by duplicating the scenario generated for the first image processing apparatus. This configuration or method makes it possible to reduce the workload of the administrator.

<<Second Embodiment>>

In the first embodiment, involvement of the administrator in automatic generation of scenarios according to the methods "a", "b1", and "b2" is not considered. However, the convenience of the image processing apparatus utilization system 100 may be increased by allowing the administrator to determine whether to automatically generate scenarios. In this embodiment, the image processing apparatus utilization system 100 is configured to allow the administrator to determine whether to request the SMC 11 to automatically generate scenarios.

Figure 13:
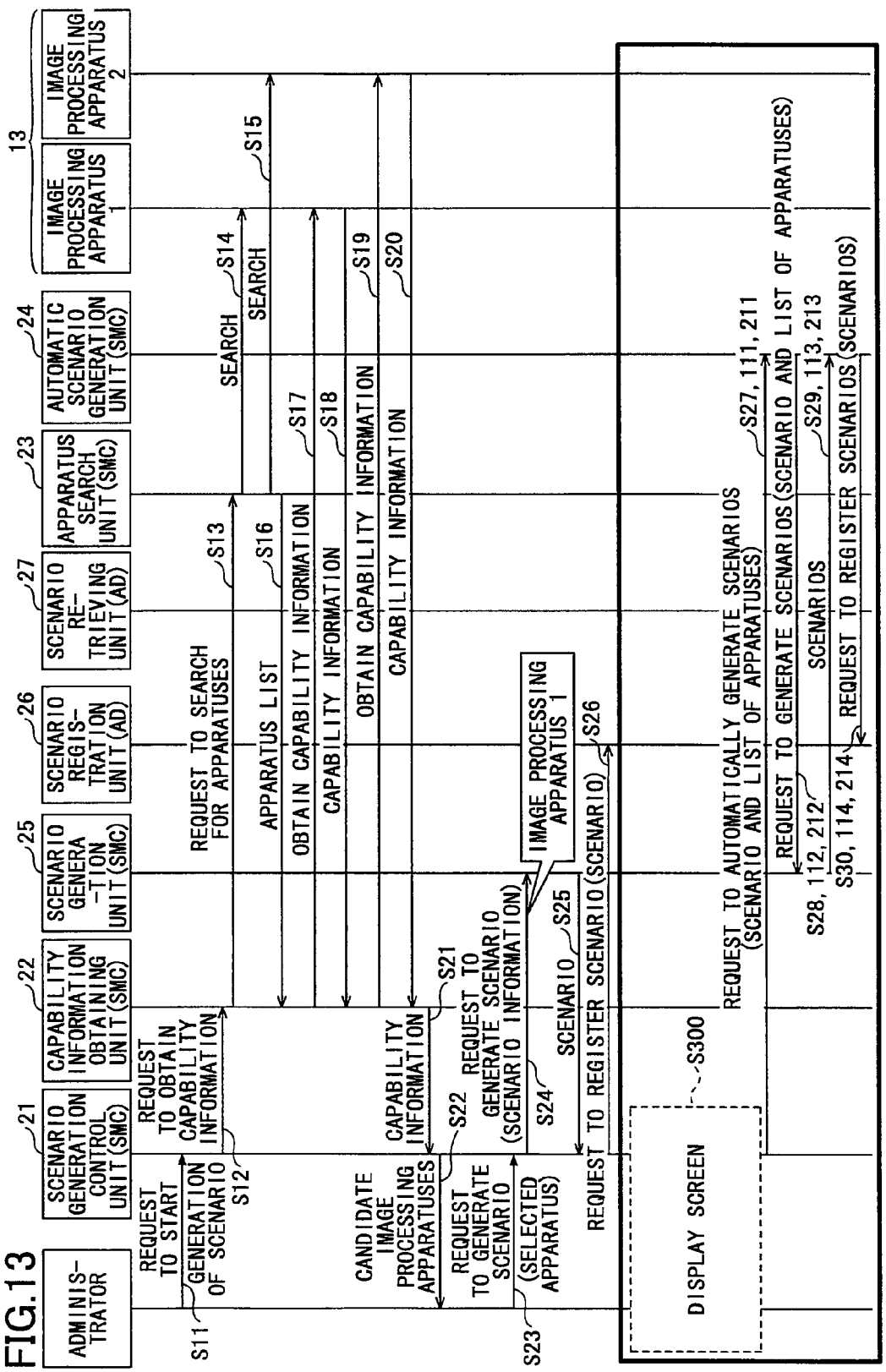
FIG. 13 is a sequence chart showing an exemplary process of registering scenarios in an image processing apparatus utilization system.

FIG. 13 is a sequence chart showing an exemplary process of registering scenarios in the image processing apparatus utilization system 100. The process of FIG. 13 includes step S300 for displaying a screen after step S23 (or S26).

Figure 14:
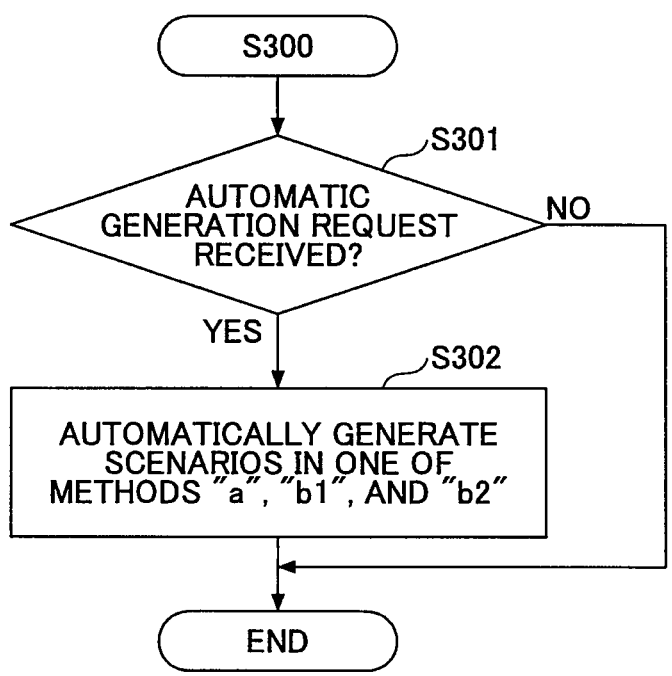
FIG. 14 is a flowchart showing details of step S300 in FIG. 13.

FIG. 14 is a flowchart showing details of step S300 in FIG. 13. As described in the first embodiment, in step S23, the administrator requests the scenario generation control unit 21 to generate a scenario for the image processing apparatus 1 (S23).

In response, the scenario generation control unit 21 displays, on the display 80 of the SMC 11, a screen asking the administrator whether to automatically generate scenarios (S301).

Figure 15:
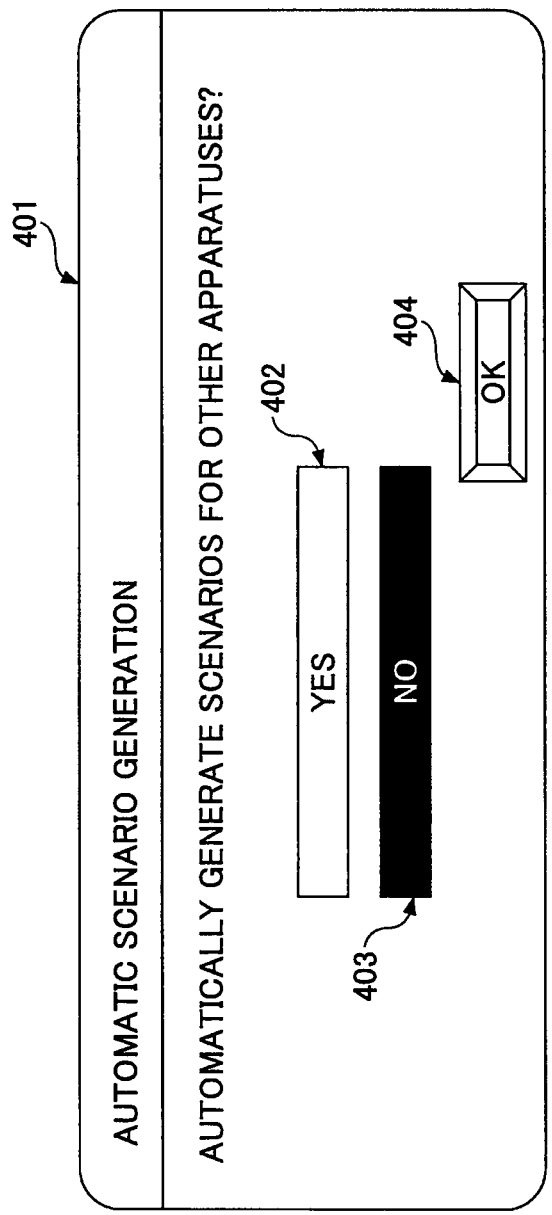
FIG. 15 is a drawing illustrating an exemplary screen asking an administrator whether to automatically generate scenarios.

FIG. 15 is a drawing illustrating an exemplary screen 401 displayed on the display 80 of the SMC 11 to ask the administrator whether to automatically generate scenarios. As shown in FIG. 15, the screen 401 includes a message "Automatically generate scenarios for other apparatuses?", a YES key 402, a NO key 403, and an OK key 404.

When the administrator selects the YES key 402 or the NO key 403 using a mouse or a keyboard, the selected key is highlighted. In FIG. 15, the NO key 403 is selected. If the administrator selects the OK key 404 while the YES key 402 is highlighted, the scenario generation control unit 21 receives a request to automatically generate scenarios. If the administrator selects the OK key 403 while the NO key 403 is highlighted, the scenario generation control unit 21 does not receive a request to automatically generate scenarios.

In FIG. 14, if the request to automatically generate scenarios is not received (NO in S301), the scenario generation control unit 21 does not perform step S27 (S111 or S211) and subsequent steps. As a result, scenarios for the image processing apparatuses n are not automatically generated.

Meanwhile, if the request to automatically generate scenarios is received (YES in S301), the scenario generation control unit 21 performs step S27 (S111 or S211) and subsequent steps. As a result, scenarios for the image processing apparatuses n are automatically generated according to one of the methods "a", "b1", and "b2".

Thus, the image processing apparatus utilization system 100 of this embodiment allows the administrator to determine whether to automatically generate "duplicate" scenarios and thereby makes it possible to prevent generation of unnecessary scenarios that are not likely to be used.

<<Third Embodiment>>

As described above, the second embodiment makes it possible to allow the administrator to determine whether to automatically generate scenarios. Here, it is possible to further increase the convenience of the image processing apparatus utilization system 100 by allowing the administrator to select image processing apparatuses for which scenarios are to be automatically generated. In this embodiment, the image processing apparatus utilization system 100 is configured to allow the administrator to select image processing apparatuses for which scenarios are to be automatically generated.

Figure 16:
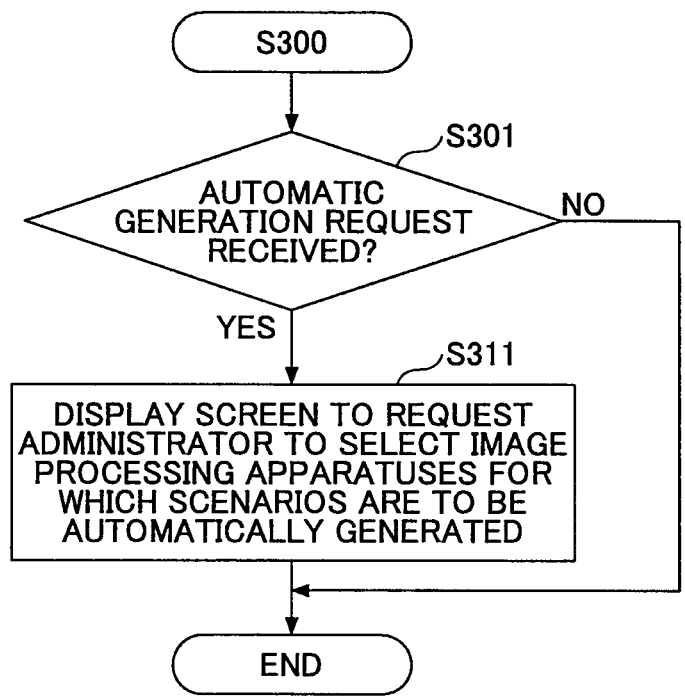
FIG. 16 is another flowchart showing details of step S300 in FIG. 13.

FIG. 16 is another flowchart showing details of step S300 in FIG. 13. As described in the first embodiment, in step S23, the administrator requests the scenario generation control unit 21 to generate a scenario for the image processing apparatus 1 (S23).

In response, the scenario generation control unit 21 displays, on the display 80 of the SMC 11, a screen (the screen 401 of FIG. 15) asking the administrator whether to automatically generate scenarios for image processing apparatuses n (S301). Step S301 is substantially the same as in the second embodiment and therefore details of step S301 are omitted here.

If the request to automatically generate scenarios is received (YES in S301), the scenario generation control unit 21 displays a screen to request the administrator to select image processing apparatuses n for which scenarios are to be automatically generated (S311). More specifically, the scenario generation control unit 21 displays one of the screens shown by FIGS. 17A through 17C on the display 80 of the SMC 11.

Figure 17B:
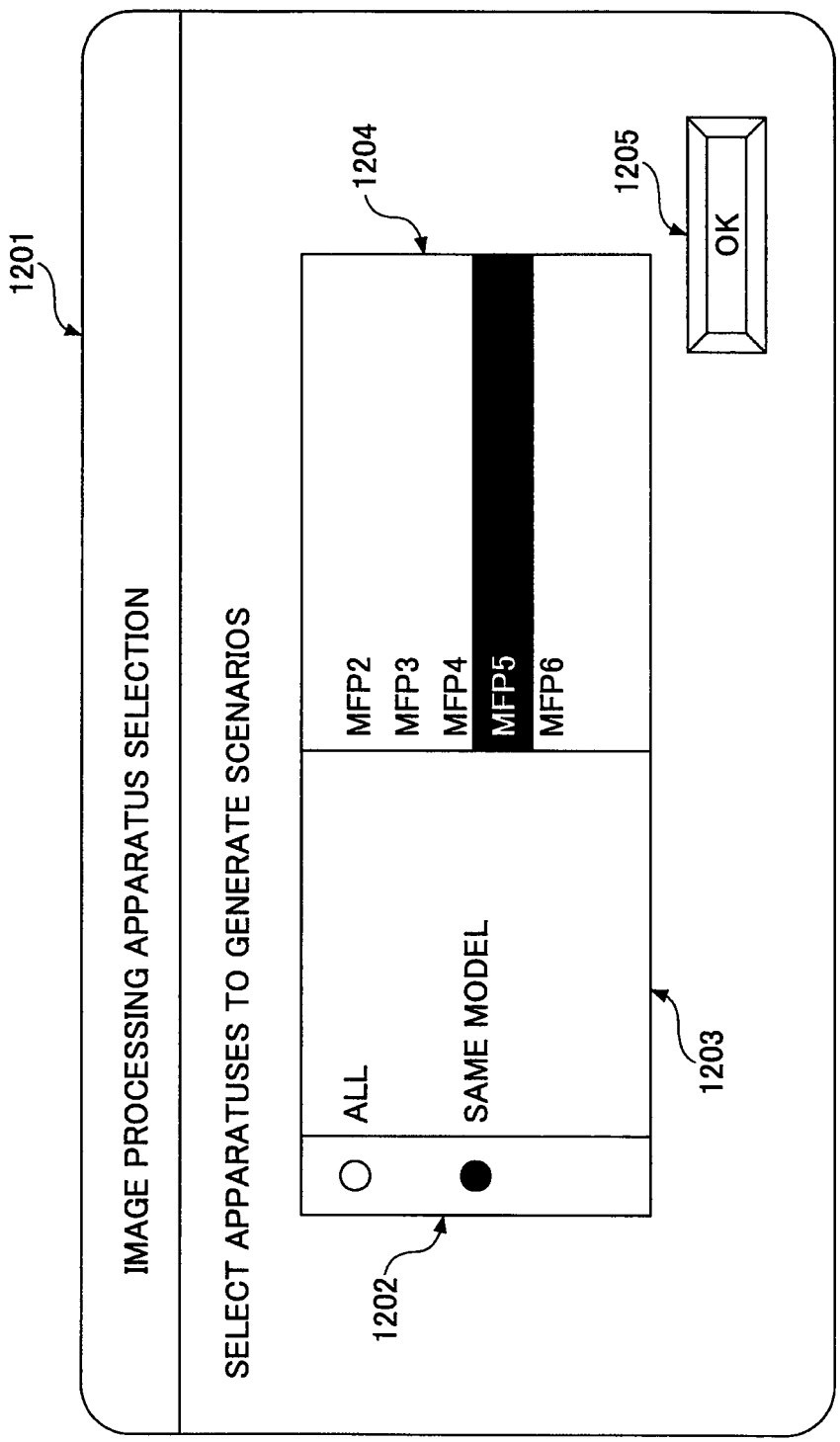

FIGS. 17A through 17C are drawings illustrating exemplary screens displayed on the display 80 of the SMC 11. FIG. 17A shows a screen 501 that allows the administrator to select image processing apparatuses n regardless of their capabilities. FIG. 17B shows a screen 1201 that allows the administrator to select from the image processing apparatuses n that are the same model as the image processing apparatus 1. FIG. 17C shows a screen 1211 that allows the administrator to select from image processing apparatuses n having the same specifications as those of the image processing apparatus 1. One of the screens 502, 1202, and 1212 is displayed according to a setting in the SMC 11. In FIGS. 17A through 17C, the image processing apparatuses n are represented by MFP2 through MFP6.

With the screen 501 of FIG. 17A, the administrator can select one or more image processing apparatuses n for which scenarios are to be generated regardless of their models or specifications. On the screen 501, the administrator selects one or more image processing apparatuses n listed in a box 502 by using a mouse or a keyboard. The selected image processing apparatuses n are highlighted. If the administrator selects an OK key 503 while one or more image processing apparatuses n are selected (highlighted), the scenario generation control unit 21 receives a list (e.g., apparatus identifiers) of the selected image processing apparatuses n.

Unlike the first embodiment where scenarios are automatically generated for all the image processing apparatuses n, this embodiment allows the administrator to select image processing apparatus n and thereby makes it possible to prevent automatic generation of scenarios for image processing apparatuses n that are less likely to be used or have different specifications from the image processing apparatus 1.

With the screen 1201 of FIG. 17B, the administrator can select image processing apparatuses for which scenarios are to be automatically generated from the image processing apparatuses n that are the same model as the image processing apparatus 1 for which a scenario has been generated. The screen 1201 includes a box 1202 for selecting whether to display "All" apparatuses or apparatuses of the "Same Model" in a box 1204. The box 1201 includes radio buttons for "All" and "Same Model". When the administrator selects the radio button for "All" with a mouse or a keyboard, all candidate image processing apparatuses (image processing apparatuses n) are listed in the box 1204. Meanwhile, when the administrator selects the radio button for "Same Model" with a mouse or a keyboard, candidate image processing apparatuses that are the same model as the image processing apparatus 1 for which a scenario has been generated are listed in the box 1204.

The administrator selects one or more of the image processing apparatuses n listed in the box 1204 by using a mouse or a keyboard. The selected image processing apparatuses n are highlighted. If the administrator selects an OK key 1205 while one or more image processing apparatuses n are selected (highlighted), the scenario generation control unit 21 receives a list (e.g., apparatus identifiers) of the selected image processing apparatuses n.

If all image processing apparatuses n are simply listed on a screen and some of them are selected by the administrator, not all of the selected image processing apparatuses n may be able to use the automatically generated scenarios. Meanwhile, listing only image processing apparatuses n that are the same model as the image processing apparatus 1 enables the administrator to select only those image processing apparatuses n that can use the automatically generated scenarios and thereby makes it possible to increase user convenience.

With the screen 1211 of FIG. 17C, the administrator can select image processing apparatuses for which scenarios are to be automatically generated from the image processing apparatuses n having the same specifications as the image processing apparatus 1 for which a scenario has been generated. The screen 1211 includes a box 1212 for selecting whether to display "All" apparatuses or apparatuses with the "Same Specifications" in a box 1214. The box 1212 includes radio buttons for "All" and "Same Specifications". When the administrator selects the radio button for "All" with a mouse or a keyboard, all candidate image processing apparatuses (image processing apparatuses n) are listed in the box 1214. Meanwhile, when the administrator selects the radio button for "Same Specifications" with a mouse or a keyboard, candidate image processing apparatuses having the same specifications as those of the image processing apparatus 1 for which a scenario has been generated are listed in the box 1214.

The administrator selects one or more of the image processing apparatuses n listed in the box 1214 by using a mouse or a keyboard. The selected image processing apparatuses n are highlighted. If the administrator selects an OK key 1215 while one or more image processing apparatuses n are selected (highlighted), the scenario generation control unit 21 receives a list (e.g., apparatus identifiers) of the selected image processing apparatuses n.

If all image processing apparatuses n are simply listed on a screen and some of them are selected by the administrator, not all of the selected image processing apparatuses n may be able to use the automatically generated scenarios. Meanwhile, listing only image processing apparatuses n having the same specifications as those of the image processing apparatus 1 enables the administrator to select only those image processing apparatuses n that can use the automatically generated scenarios and thereby makes it possible to increase user convenience.

Referring back to FIG. 16, when receiving a list of selected image processing apparatuses n for which scenarios are to be automatically generated (S311), the scenario generation control unit 21 automatically generates scenarios for the selected image processing apparatuses n.

More specifically, when image processing apparatuses n are selected using the screen 501 of FIG. 17A, the scenario generation control unit 21 performs step S27 and subsequent steps shown in FIG. 13; when image processing apparatuses n are selected using the screen 1201 of FIG. 17B, the scenario generation control unit 21 performs step S111 and subsequent steps shown in FIG. 13; and when image processing apparatuses n are selected using the screen 1211 of FIG. 17C, the scenario generation control unit 21 performs step S211 and subsequent steps shown in FIG. 13

Thus, the image processing apparatus utilization system 100 of this embodiment allows the administrator to select image processing apparatuses n for which scenarios are to be generated by the SMC 11 and thereby makes it possible to prevent automatic generation of unused scenarios. Also, the above embodiment makes it possible to list only image processing apparatuses n that are the same model as or have the same specifications as the image processing apparatus 1. This in turn makes it possible for the administrator to select only those image processing apparatuses that are able to use the automatically generated scenario and thereby makes it possible to increase the convenience of the image processing apparatus utilization system 100.

<<Fourth Embodiment>>

In the third embodiment, it is necessary to preset in the SMC 11 whether to display the image processing apparatuses n that are the same model as the image processing apparatus 1 or the image processing apparatuses n having the same specifications as the image processing apparatus 1. In a fourth embodiment, the image processing apparatus utilization system 100 is configured to allow the administrator to determine whether to display the image processing apparatuses n that are the same model as the image processing apparatus 1 or the image processing apparatuses n having the same specifications as the image processing apparatus 1.

As in FIG. 16 of the third embodiment, if a request to automatically generate scenarios is received (YES in S301), the scenario generation control unit 21 displays a screen to request the administrator to select image processing apparatuses n for which scenarios are to be automatically generated (S311). In this embodiment, the scenario generation control unit 21 displays a screen 1301 as shown in FIG. 18 on the display 80 of the SMC 11.

The screen 1301 shown in FIG. 18 allows the administrator to determine whether to display the image processing apparatuses n that are the same model as the image processing apparatus 1 or the image processing apparatuses n having the same specifications as the image processing apparatus 1.

The screen 1301 includes a box 1302 for selecting whether to display "All" apparatuses, apparatuses of the "Same Model", or apparatuses with the "Same Specifications" in a box 1304. The box 1302 includes radio buttons for "All", "Same Model", and "Same Specifications". When the administrator selects the radio button for "All" with a mouse or a keyboard, all candidate image processing apparatuses (image processing apparatuses n) are listed in the box 1304. When the administrator selects the radio button for "Same Model" with a mouse or a keyboard, candidate image processing apparatuses that are the same model as the image processing apparatus 1 for which a scenario has been generated are listed in the box 1304. When the administrator selects the radio button for "Same Specifications" with a mouse or a keyboard, candidate image processing apparatuses having the same specifications as the image processing apparatus 1 for which a scenario has been generated are listed in the box 1304.

The administrator selects one or more of the image processing apparatuses n listed in the box 1304 by using a mouse or a keyboard. The selected image processing apparatuses n are highlighted. If the administrator selects an OK key 1305 while one or more image processing apparatuses n are selected (highlighted), the scenario generation control unit 21 receives a list (e.g., apparatus identifiers) of the selected image processing apparatuses n.

Subsequent steps are substantially the same as those in the third embodiment. When receiving the list of selected image processing apparatuses n for which scenarios are to be automatically generated from the screen 1301 of FIG. 18 (S311), the scenario generation control unit 21 automatically generates scenarios for the selected image processing apparatuses n.

As described above, the fourth embodiment enables the administrator to select image processing apparatuses for which scenarios are to be automatically generated from "All" apparatuses, apparatuses of the "Same Model", or apparatuses with the "Same Specifications" listed in the box 1304. This configuration further increases the convenience of the image processing apparatus utilization system 100.

In the above embodiments, functions of the scenario generation control unit 21 may be implemented as a delivery setting receiving unit, a scenario generation determining unit, a scenario generation selecting unit, an image processing apparatus selecting unit, and a candidate list selecting unit.

An aspect of the present invention provides an image processing apparatus utilization system and an image processing apparatus utilization method that makes it possible to easily register scenarios for image processing apparatuses by duplicating a scenario registered for a given image processing apparatus and thereby makes it possible to reduce the workload for registering scenarios.

The present invention is not limited to the specifically disclosed embodiments, and variations and modifications may be made without departing from the scope of the present invention.

The present application is based on Japanese Priority Application No. 2009-162168, filed on Jul. 8, 2009, the entire contents of which are hereby incorporated herein by reference.

What is claimed is:

1. An image processing apparatus utilization system, comprising:
   computer implemented image processing apparatuses connected to a network;
   an apparatus search unit configured to search for the image processing apparatuses connected to the network;
   a capability information obtaining unit configured to obtain scanning capability information from the image processing apparatuses found by the apparatus search unit;
   a delivery setting receiving unit configured to receive a delivery setting for a first image processing apparatus;

a first scenario generation unit configured to generate a scenario including the scanning capability information and the delivery setting for the first image processing apparatus;

a second scenario generation unit configured to generate scenarios for a second image processing apparatuses based on the scenario for the first image processing apparatus;

a scenario storing unit configured to store the scenarios generated by the first and second scenario generation units, wherein each of the image processing apparatuses is configured to obtain a scenario corresponding to the respective image processing apparatus from the scenario storing unit and to generate image data by scanning a document according to the scanning capability information in the obtained scenario;

an image delivery unit configured to receive the scenario and the image data from one of the image processing apparatuses and to send the image data according to the delivery setting in the scenario; and a scenario generation selecting unit configured to request a user to determine whether to generate the scenarios for the second image processing apparatuses based on the scenario for the first image processing apparatus.

2. The image processing apparatus utilization system as claimed in claim 1, further comprising:

a scenario generation determining unit, wherein the apparatus search unit is configured to also obtain apparatus information from the image processing apparatuses; and the scenario generation determining unit is configured to determine whether the apparatus information of the second image processing apparatuses is the same as the apparatus information of the first image processing apparatus, and to cause the second scenario generation unit to generate scenarios only for the second image processing apparatuses having the same apparatus information as the first image processing apparatus.

3. The image processing apparatus utilization system as claimed in claim 2, wherein the apparatus information includes model information indicating a model of a corresponding one of the image processing apparatuses; and the scenario generation determining unit is configured to determine whether the model information of the second image processing apparatuses is the same as the model information of the first image processing apparatus, and to cause the second scenario generation unit to generate the scenarios only for the second image processing apparatuses having the same model information as the first image processing apparatus.

4. The image processing apparatus utilization system as claimed in claim 2, wherein the scenario generation determining unit is configured to determine whether specifications of the second image processing apparatuses are the same as specifications of the first image processing apparatus based on the scanning capability information, and to cause the second scenario generation unit to generate the scenarios only for the second image processing apparatuses having the same specifications as the first image processing apparatus.

5. An image processing apparatus utilization system, comprising:

computer implemented image processing apparatuses connected to a network;

an apparatus search unit configured to search for the image processing apparatuses connected to the network;

a capability information obtaining unit configured to obtain scanning capability information from the image processing apparatuses found by the apparatus search unit;

a delivery setting receiving unit configured to receive a delivery setting for a first image processing apparatus;

a first scenario generation unit configured to generate a scenario including the scanning capability information and the delivery setting for the first image processing apparatus;

a second scenario generation unit configured to generate scenarios for a second image processing apparatuses based on the scenario for the first image processing apparatus;

a scenario storing unit configured to store the scenarios generated by the first and second scenario generation units, wherein each of the image processing apparatuses is configured to obtain a scenario corresponding to the respective image processing apparatus from the scenario storing unit and to generate image data by scanning a document according to the scanning capability information in the obtained scenario; and an image processing apparatus selecting unit configured to request a user to select the second image processing apparatuses for which the scenarios are to be generated based on the scenario for the first image processing apparatus.

6. An image processing apparatus utilization system, comprising:

computer implemented image processing apparatuses connected to a network;

an apparatus search unit configured to search for the image processing apparatuses connected to the network;

a capability information obtaining unit configured to obtain scanning capability information from the image processing apparatuses found by the apparatus search unit;

a delivery setting receiving unit configured to receive a delivery setting for a first image processing apparatus;

a first scenario generation unit configured to generate a scenario including the scanning capability information and the delivery setting for the first image processing apparatus;

a second scenario generation unit configured to generate scenarios for a second image processing apparatuses based on the scenario for the first image processing apparatus;

a scenario storing unit configured to store the scenarios generated by the first and second scenario generation units, wherein each of the image processing apparatuses is configured to obtain a scenario corresponding to the respective image processing apparatus from the scenario storing unit and to generate image data by scanning a document according to the scanning capability information in the obtained scenario;

a scenario generation determining unit, wherein the apparatus search unit is configured to also obtain apparatus information from the image processing apparatuses, and the scenario generation determining unit is configured to determine whether the apparatus information of the second image processing apparatuses is the same as the apparatus information of the first image processing apparatus, and to cause the second scenario generation unit to generate scenarios only for the second image processing apparatuses having the same apparatus information as the first image processing apparatus; and an image processing apparatus selecting unit configured to request a user to select image processing apparatuses, for which the scenarios are to be generated based on the scenario for the first image processing apparatus, from the second image processing apparatuses that are determined by the scenario generation determining unit to have the same apparatus information as the first image processing apparatus.

7. An image processing apparatus utilization system, comprising:

computer implemented image processing apparatuses connected to a network;

an apparatus search unit configured to search for the image processing apparatuses connected to the network;

a capability information obtaining unit configured to obtain scanning capability information from the image processing apparatuses found by the apparatus search unit;

a delivery setting receiving unit configured to receive a delivery setting for a first image processing apparatus;

a first scenario generation unit configured to generate a scenario including the scanning capability information and the delivery setting for the first image processing apparatus;

a second scenario generation unit configured to generate scenarios for a second image processing apparatuses based on the scenario for the first image processing apparatus;

a scenario storing unit configured to store the scenarios generated by the first and second scenario generation units, wherein each of the image processing apparatuses is configured to obtain a scenario corresponding to the respective image processing apparatus from the scenario storing unit and to generate image data by scanning a document according to the scanning capability information in the obtained scenario;

a scenario generation determining unit, wherein the apparatus search unit is configured to also obtain apparatus information from the image processing apparatuses, and the scenario generation determining unit is configured to determine whether the apparatus information of the second image processing apparatuses is the same as the apparatus information of the first image processing apparatus, and to cause the second scenario generation unit to generate scenarios only for the second image processing apparatuses having the same apparatus information as the first image processing apparatus, wherein the apparatus information includes model information indicating a model of a corresponding one of the image processing apparatuses, and the scenario generation determining unit is configured to determine whether the model information of the second image processing apparatuses is the same as the model information of the first image processing apparatus, and to cause the second scenario generation unit to generate the scenarios only for the second image processing apparatuses having the same model information as the first image processing apparatus; and an image processing apparatus selecting unit configured to request a user to select image processing apparatuses, for which the scenarios are to be generated based on the scenario for the first image processing apparatus, from the second image processing apparatuses that are determined by the scenario generation determining unit to have the same model information as the first image processing apparatus.

8. An image processing apparatus utilization system, comprising:

computer implemented image processing apparatuses connected to a network;

an apparatus search unit configured to search for the image processing apparatuses connected to the network;

a capability information obtaining unit configured to obtain scanning capability information from the image processing apparatuses found by the apparatus search unit;

a delivery setting receiving unit configured to receive a delivery setting for a first image processing apparatus;

a first scenario generation unit configured to generate a scenario including the scanning capability information and the delivery setting for the first image processing apparatus;

a second scenario generation unit configured to generate scenarios for a second image processing apparatuses based on the scenario for the first image processing apparatus;

a scenario storing unit configured to store the scenarios generated by the first and second scenario generation units, wherein each of the image processing apparatuses is configured to obtain a scenario corresponding to the respective image processing apparatus from the scenario storing unit and to generate image data by scanning a document according to the scanning capability information in the obtained scenario;

a scenario generation determining unit, wherein the apparatus search unit is configured to also obtain apparatus information from the image processing apparatuses, and the scenario generation determining unit is configured to determine whether the apparatus information of the second image processing apparatuses is the same as the apparatus information of the first image processing apparatus, and to cause the second scenario generation unit to generate scenarios only for the second image processing apparatuses having the same apparatus information as the first image processing apparatus, wherein the scenario generation determining unit is configured to determine whether specifications of the second image processing apparatuses are the same as specifications of the first image processing apparatus based on the scanning capability information, and to cause the second scenario generation unit to generate the scenarios only for the second image processing apparatuses having the same specifications as the first image processing apparatus; and an image processing apparatus selecting unit configured to request a user to select image processing apparatuses, for which the scenarios are to be generated based on the scenario for the first image processing apparatus, from the second image processing apparatuses that are determined by the scenario generation determining unit to have the same specifications as the first image processing apparatus.

9. The image processing apparatus utilization system as claimed in claim 8, wherein the determined specifications are the resolution and the color mode.

10. An image processing apparatus utilization system, comprising:

computer implemented image processing apparatuses connected to a network;

an apparatus search unit configured to search for the image processing apparatuses connected to the network;

a capability information obtaining unit configured to obtain scanning capability information from the image processing apparatuses found by the apparatus search unit;

a delivery setting receiving unit configured to receive a delivery setting for a first image processing apparatus;

a first scenario generation unit configured to generate a scenario including the scanning capability information and the delivery setting for the first image processing apparatus;

a second scenario generation unit configured to generate scenarios for a second image processing apparatuses based on the scenario for the first image processing apparatus;

a scenario storing unit configured to store the scenarios generated by the first and second scenario generation units, wherein each of the image processing apparatuses is configured to obtain a scenario corresponding to the respective image processing apparatus from the scenario storing unit and to generate image data by scanning a document according to the scanning capability information in the obtained scenario;

a scenario generation determining unit, wherein the apparatus search unit is configured to also obtain apparatus information from the image processing apparatuses, and the scenario generation determining unit is configured to determine whether the apparatus information of the second image processing apparatuses is the same as the apparatus information of the first image processing apparatus, and to cause the second scenario generation unit to generate scenarios only for the second image processing apparatuses having the same apparatus information as the first image processing apparatus;

a candidate list selecting unit, wherein the scenario generation determining unit is configured to determine whether model information in the apparatus information or specifications obtained from the scanning capability information of the second image processing apparatuses is the same as that of the first image processing apparatus; and the candidate list selecting unit is configured to request a user to determine whether to display a list of the second image processing apparatuses having the same model information as the first image processing apparatus or a list of the second image processing apparatuses having the same specifications as the first image processing apparatus, and to request the user to select image processing apparatuses for which the scenarios are to be generated based on the scenario for the first image processing apparatus from the displayed list.

11. A method for an image processing apparatus utilization system including computer implemented image processing apparatuses, a scenario generation unit, a scenario storing unit, and an image delivery unit that are connected via a network, comprising:

steps, performed by the scenario generation unit, of searching for the image processing apparatuses connected to the network, obtaining scanning capability information from the image processing apparatuses found in the searching step, receiving a delivery setting for a first image processing apparatus, generating a scenario including the scanning capability information and the delivery setting for the first image processing apparatus, requesting a user to determine a second image processing apparatus for which scenarios are to be generated, based on one of the specifications and the model information of the first and second image processing apparatuses, and generating scenarios for the determined second image processing apparatuses based on the scenario for the first image processing apparatus;

a step, performed by the scenario storing unit, of storing the scenarios generated by the scenario generation unit;

a step, performed by one of the image processing apparatuses, of obtaining a scenario corresponding to the respective one of the image processing apparatuses from the scenario storing unit and generating image data by scanning a document according to the scanning capability information in the obtained scenario; and a step, performed by an image delivery unit, of receiving the scenario and the image data from the one of the image processing apparatuses and sending the image data according to the delivery setting in the scenario.

* * * * *

UNITED STATES PATENT AND TRADEMARK OFFICE
CERTIFICATE OF CORRECTION

PATENT NO. : 8,599,442 B2
APPLICATION NO. : 12/831592
DATED : December 3, 2013
INVENTOR(S) : Reiji Yukumoto et al.

It is certified that error appears in the above-identified patent and that said Letters Patent is hereby corrected as shown below:

On the Title page, at item (75), please correct the residence of Reiji Yukumoto from "Saltama" to "Saitama".

Signed and Sealed this
Eighth Day of April, 2014

Michelle K. Lee
*Deputy Director of the United States Patent and Trademark Office*